United States Patent
Jessop

(10) Patent No.: US 8,508,436 B2
(45) Date of Patent: Aug. 13, 2013

(54) ELECTRONIC DISPLAY SYSTEMS

(75) Inventor: Richard V. Jessop, New York, NY (US)

(73) Assignee: Intellectual Properties I Kft, Budapest (HU)

( * ) Notice: Subject to any disclaimer, the term of this patent is extended or adjusted under 35 U.S.C. 154(b) by 108 days.

(21) Appl. No.: 12/684,328

(22) Filed: Jan. 8, 2010

(65) Prior Publication Data
US 2010/0109987 A1    May 6, 2010

Related U.S. Application Data

(63) Continuation of application No. 11/528,756, filed on Sep. 28, 2006, now abandoned.

(60) Provisional application No. 60/721,712, filed on Sep. 28, 2005.

(51) Int. Cl.
  G09G 3/19    (2006.01)
  G09G 3/16    (2006.01)
  G09G 3/34    (2006.01)
  G09G 3/38    (2006.01)
  G06F 3/038   (2006.01)
  G02B 26/00   (2006.01)

(52) U.S. Cl.
  USPC ......... 345/49; 345/48; 345/84; 345/105; 345/107; 345/204; 359/296

(58) Field of Classification Search
  USPC ............ 345/84, 107, 33–34, 49, 204, 48, 345/105; 359/296
  See application file for complete search history.

(56) References Cited

U.S. PATENT DOCUMENTS

| | | |
|---|---|---|
| 4,176,345 A | 11/1979 | Micheron et al. |
| 4,235,522 A | 11/1980 | Simpson et al. |
| 4,248,501 A | 2/1981 | Simpson |
| 4,419,663 A | 12/1983 | Kohashi |
| 4,442,019 A | 4/1984 | Marks |
| 4,569,575 A | 2/1986 | Le Pesant et al. |

(Continued)

OTHER PUBLICATIONS

Vallet et al., "Limited Phenomena for the Spreading of Water on Polymer Films for Electrowetting," The European Journal B, vol. 11, Issue 4, pp. 583-591, 1999.

(Continued)

*Primary Examiner* — Joe H Cheng
*Assistant Examiner* — Jarurat Suteerawongsa
(74) *Attorney, Agent, or Firm* — H.C. Park & Associates, PLC

(57) ABSTRACT

A display or light-modulating device incorporates one or more measures of liquid that obstruct or filter light that passes onto or through the liquid; a space distribution of different light-modulating filters, optical instrument or materials or of materials that change the frequency or color of light passing onto or through them, to emit a different frequency or color of light; and means to apply electrowetting effect to controllably modulate the location or shape of one or more measures of a polar or conductive liquid, so that at least some portion of one or more light-obstructing or light-filtering measures of liquids is caused to be located between one or more light sources and the space distribution of light-modulating filters, optical instruments or light-modulating materials, or said space distribution of materials that change the frequency or color of light passing onto or through them, to emit a different frequency or color of light, thereby controllably modulating properties of light emitted from said device.

13 Claims, 18 Drawing Sheets

(56) References Cited

U.S. PATENT DOCUMENTS

| | | |
|---|---|---|
| 4,582,391 A | 4/1986 | Legrand |
| 4,583,824 A | 4/1986 | Lea |
| 4,589,730 A | 5/1986 | Obu |
| 4,663,083 A | 5/1987 | Marks |
| 4,795,243 A | 1/1989 | Suzuki |
| 5,165,013 A | 11/1992 | Faris |
| 5,181,016 A | 1/1993 | Lee |
| 5,463,491 A | 10/1995 | Check |
| 5,574,598 A | 11/1996 | Koumura et al. |
| 5,582,700 A | 12/1996 | Bryning et al. |
| 5,731,792 A | 3/1998 | Sheridon |
| 5,757,345 A | 5/1998 | Sheridon |
| 5,808,593 A | 9/1998 | Sheridon |
| 5,815,306 A | 9/1998 | Sheridon et al. |
| 5,872,552 A | 2/1999 | Gordon et al. |
| 5,892,497 A | 4/1999 | Robertson |
| 5,956,005 A | 9/1999 | Sheridon |
| 5,961,804 A | 10/1999 | Jacobson et al. |
| 6,114,405 A | 9/2000 | Zhuang et al. |
| 6,120,558 A | 9/2000 | Poddevin et al. |
| 6,184,856 B1 * | 2/2001 | Gordon et al. ............... 345/107 |
| 6,221,267 B1 | 4/2001 | Ikeda et al. |
| 6,369,954 B1 | 4/2002 | Berge et al. |
| 6,377,249 B1 | 4/2002 | Mumford |
| 6,762,566 B1 * | 7/2004 | George et al. ............... 315/169.3 |
| 6,924,792 B1 * | 8/2005 | Jessop ........................... 345/179 |
| 2005/0151709 A1 * | 7/2005 | Jacobson et al. ............... 345/84 |

OTHER PUBLICATIONS

Welcome to Nanolytics-Making Microfluids Just a Tool, Presented at "Macro Results from Microarrays," Conference in Boston, MA, Apr. 3, 2000.

Non-Final Office Action issued for related U.S. Appl. No. 09/803,445 dated Dec. 13, 2002.

Final Office Action issued for related U.S. Appl. No. 09/803,445 dated Sep. 16, 2003.

Non-Final Office Action issued for related U.S. Appl. No. 09/803,445 dated Jan. 9, 2004.

Notice of Allowance issued for related U.S. Appl. No. 09/803,445 dated Jan. 4, 2005.

Non-Final Office Action issued for related U.S. Appl. No. 11/130,432 dated Jan. 23, 2007.

Notice of Allowance issued for related U.S. Appl. No. 11/130,432 dated Oct. 26, 2007.

Non-Final Office Action issued for related U.S. Appl. No. 11/980,775 dated Nov. 17, 2009.

Non-Final Office Action issued for related U.S. Appl. No. 11/528,756 dated Jul. 8, 2009.

Non-Final Office Action issued for related U.S. Appl. No. 12/781,545 dated May 3, 2012.

Non-Final Office Action dated Jan. 17, 2013 issued for U.S. Appl. No. 12/781,545.

* cited by examiner

Light source electrodes
resistant electrodes
multi-coloured filters
address lines
lenses
display screen
unwetted 'energy wall'

Figure 22
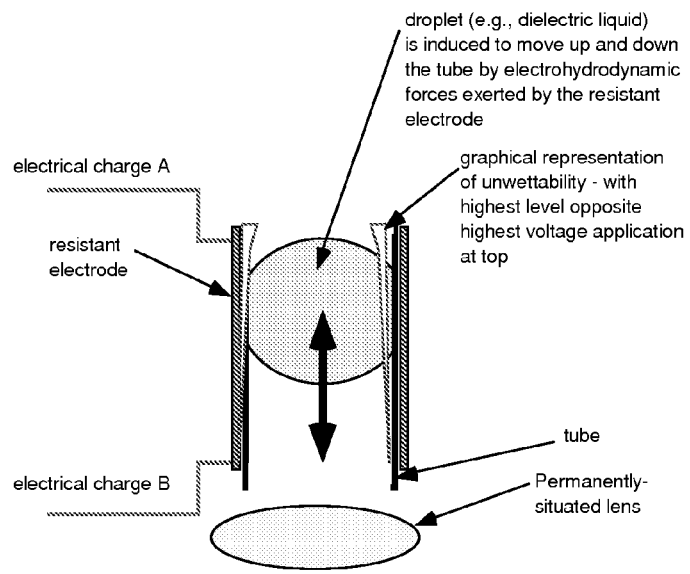
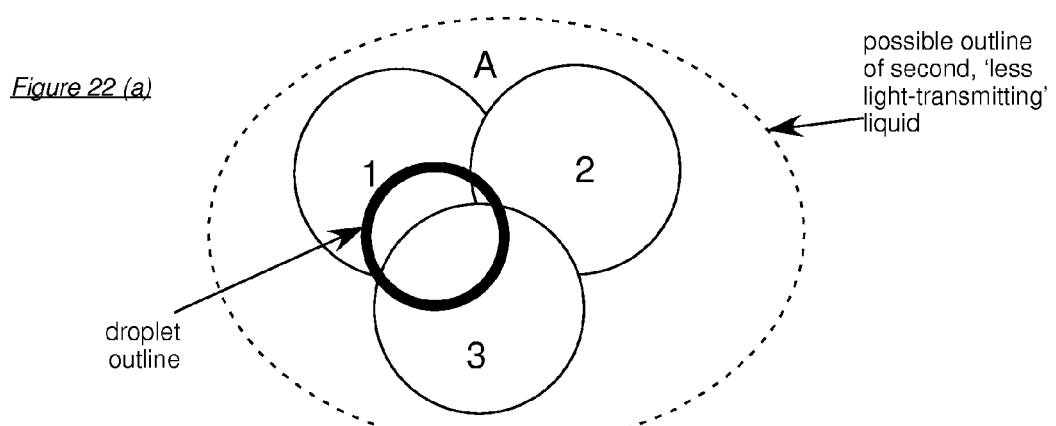
Figure 22 (a)

Figure 23
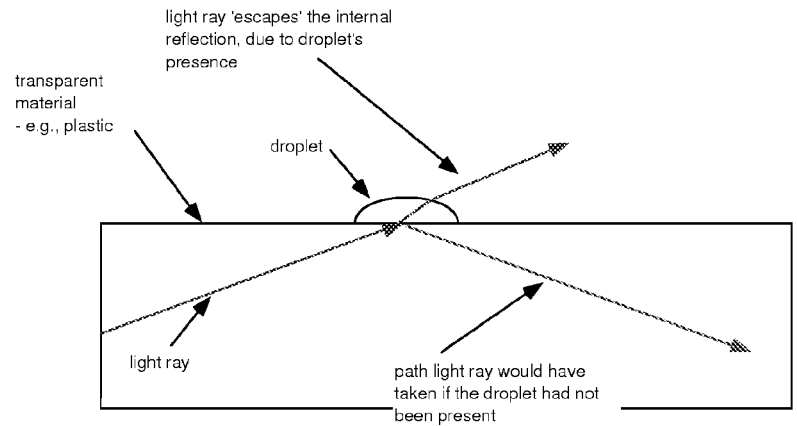
Figure 24
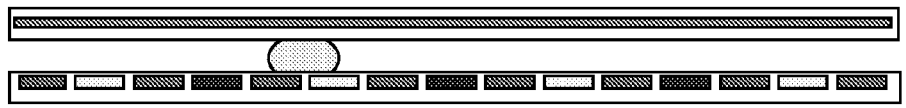
Figure 25
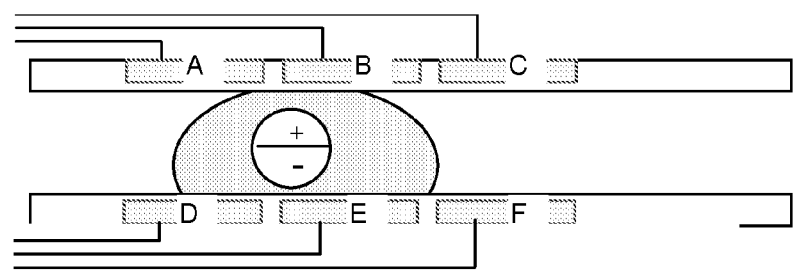
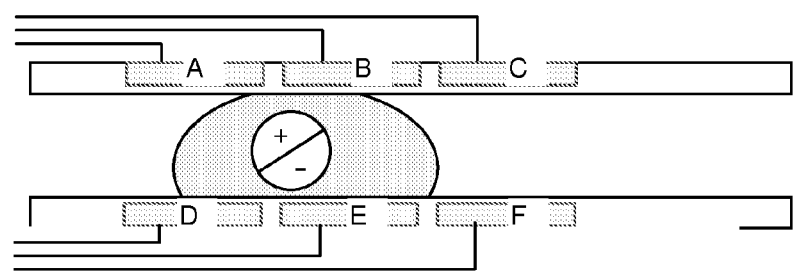

ELECTRONIC DISPLAY SYSTEMS

CROSS-REFERENCE TO RELATED APPLICATION

This application is a continuation of U.S. patent application Ser. No. 11/528,756, filed Sep. 28, 2006 now abandoned, which claims priority under 35 U.S.C. §119(e) from U.S. Provisional Patent Application No. 60/721,712, filed Sep. 28, 2005, both of which are incorporated by reference herein in their entirety.

BACKGROUND OF THE INVENTION

U.S. Pat. No. 6,924,792, by the inventor hereof, teaches various approaches to using electric fields and/or electrowetting, and/or electrostatic techniques to move, or distort the shape of, liquid droplets located between polymer (or other) substrates were discussed, so as to change the color of light passing through display systems.

The droplet would typically—but not invariably—be located between two substrates or surfaces, at least one of which would present a hydrophobic surface to (and in respect of) the droplet(s), and said droplets could in some approaches be present together with one or more other liquids (typically one other) where said measures of liquid would, typically, be mutually-immiscible (e.g., a polar liquid droplet together with a non-polar liquid such as silicon oil).

Various different positions and designs of electrodes were discussed to induce the droplet due to electrowetting effect to change its location, or change its cross-sectional profile or contact area with an surface which may be hydrophobic in respect of that liquid in the absence, at least, of any electric field affecting the surface energy relationship between liquid and solid—and thereby to affect the passage of light passing onto or through the droplet, so that, for example, the droplet focussed light onto one or more selected colors on an adjacent multi-colored filter array—and thereafter passed on, towards the display screen.

The primary approaches discussed were (a) to change the location, or change the shape of, droplets of a suitable liquid functioning as optical lenses, which focussed light onto differently-colored color filters; and (b) using similar techniques, to change the location of dyed liquid droplets, passing one or more droplets of the desired color into light paths, so that they functioned as light filters. Optionally, suitable optical lens arrangements could cause the resulting colored light to 'fill' the pixel area of the display.

In this new patent application, we will discuss different dynamic color display screen and other light-modulating techniques, devices and approaches, which though in some cases employing many fundamentally similar means of changing the location or shape of droplets as were previously discussed, are also in these new approaches concerned with using the droplets to perform functions not previously discussed, or alternatively using the droplets in different display or light color-changing arrangements than were previously disclosed.

In any of the following approaches, it should be assumed that the means of inducing a change of location or shape of the droplet(s) is by employing electrowetting effect. There may be an electrically insulating layer between the droplet(s) which are affected by electrowetting effect and one or more electrodes located on the other side of a substrate with which the droplet is in contact; in other approaches, this electrically insulating layer may, optionally, be absent.

It should also be understood, with any of the approaches described below, that, optionally, any droplet or measure of liquid which due to a change of shape or location of that droplet due to electrowetting effect is causing a modulation of properties of light may be either directly affected by an electrowetting effect acting on it, or may alternatively be a measure of liquid which is caused to itself change its location or shape due to one or more other measures of liquid (which are affected by an electrowetting effect) coming into physical contact with such a measure of liquid (as a result of the other type of droplet's change of shape or location due by electrowetting effect)—and as a result, the latter droplet (unaffected by said electrowetting effect) is itself caused to change its own shape or location. In such circumstances, the above two different classes of droplets (or measures of liquid) would normally be mutually-immiscible. This may be termed 'passive' change of a droplet's location or shape, due to a change of shape or location due to electrowetting effect of some other measure of liquid, where the 'active' droplet as a result of its change of shape or location causes the 'passive' measure of liquid to itself change location or shape. This patent, and all the descriptions of different devices and arrangements for electrowetting devices, includes within its scope optical changes which occur as a result of either such a 'passive' or such an 'active' change or shape or location of any measure of liquid.

SUMMARY OF THE INVENTION

Further electrowetting/electric field-driven/electrohydrodynamic-driven liquid droplet-based screen display approaches are disclosed herein.

BRIEF DESCRIPTION OF THE DRAWINGS

The objects and advantages of the invention will be apparent upon consideration of the following detailed description, taken in conjunction with the accompanying drawings, in which the reference characters refer to like parts throughout and in which:

FIGS. 10A, 10B, and 100 illustrate an exemplary embodiment of a droplet-manipulation apparatus that employs an electrowetting effect, to distort the shape of a droplet and therefore its light-diffracting properties.

FIG. 22(*a*) shows an exemplary embodiment of a first stage of system employing a 'windows' approach, in which one or more transparent, or translucent, or light-transmitting, droplets are located within a light-obscuring / blocking / reflective (or at least less, or differently, light-transmitting than the 1st droplet) 2nd measure of liquid.

FIG. 22(*b*) shows an exemplary embodiment of a second stage of the system in FIG. 22(*a*) in which the droplet has been moved to a new location by electrowetting effect- thus changing (for example) the color balance of the light which emerges from the system, due to the fact that the light passing through the window droplet is now passing onto 15 different items I colors within the space-distribution of different light-modulating items.

FIG. 22(*c*) shows an exemplary embodiment of a third stage of the system in FIG. 22(*a*) in which the size of the droplet (i.e., its contact area with the hydrophobic surface upon which it is moving) has increased.

FIG. 23 shows an exemplary embodiment of a system where light is passing through a liquid droplet.

FIG. 24 shows an exemplary embodiment in which a droplet is located roughly above and between two electrodes and the droplet can be moved to the right by applying appropriate electrical potential without needing to have a separate address line to each of the individual electrodes.

FIG. 25 shows an exemplary embodiment of a system depicting the fundamentals of a dipole-type electric-field controlled rotating or droplet system which can be configured in so many different ways there is little point in specifying one or another approaches, as the principles of rotating or tilting a dipole item located within an electric field, and causing it to move in response to changes in that electric field, are so well known.

The patent or application file contains at least one drawing executed in color. Copies of this patent or patent application publication with color drawings will be provided by the Office upon request and payment of the necessary fee.

DETAILED DESCRIPTION OF THE INVENTION

The Use of Droplet Displacement to Achieve 'Selective Color-Blocking'

In one possible approach, instead of using droplets either to focus or direct light onto appropriate color filters, or to pass differently-colored droplets into and out of the path of light, here we are using one or more light-obstructing or light-reflecting (e.g., dyed) droplets to block, or obstruct, or absorb, or reflect, controlled amounts of light from passing onto or through light filters of different colors or onto any space distribution of different light-modulating or light frequency-converting items or materials—thereby enabling us to controllably modulate the color or other properties of light which emerges at any particular location of a screen display or light-projecting or light-modulating device or system.

Where color filters are present, for example, changing the location and/or the liquid-solid contact area of the light-obscuring droplet at any time will consequently change the color balance of light which passes onto or through any of the colors in a space distribution of different color filters.

Optionally, the 'light-obstructing' droplets described herein may reflect light which would otherwise have passed directly onto or through said color filters, were such one or more droplets not located within light paths between the light source and the color filters.

Figure 1:
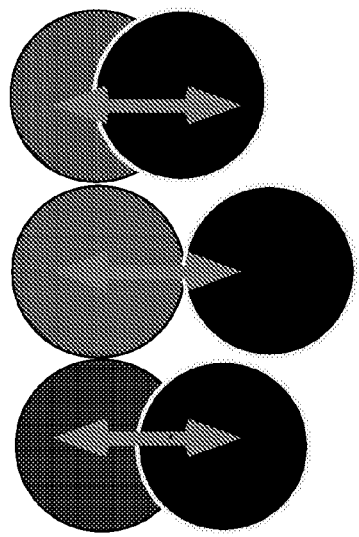
FIG. 1 shows an arrangement of light-obscuring droplets used with color filters.

As an illustration of this approach, FIG. 1 shows one possible arrangement. On the left-hand side, vertically aligned, we see (from top, moving downwards) green, red and blue color filters (as an example).

To the right of each of these filters, we see three measures of liquid, subject to control by electrowetting means, which are, in this example, colored black so as to obstruct the passage of, or to absorb light which in the absence of said black droplets being located at least partially in the light path(s) leading to the colored droplets, would have passed onto/through the colored filters.

By using electrowetting means to induce the black droplets (in this example) to move to obstruct different portions of the colored light filters, we are by this means able to determine the respective amounts of light passing onto each of the three color filters—and are thereby able to determine both the color balance, and the amplitude, of the light which emerges from the system.

One or more optical lenses may be used to cause the light from the different filters to 'merge' at or before the display screen, and to fill the 'pixel area', or to perform other optical functions.

It should also be understood that time division multiplexing, or various possible time-distribution techniques which are well-known to those skilled in the art may be employed to achieve the color-changing or other effects described in this document.

As an example of this, in FIG. 1, below, instead of varying the location of the black droplet to block or obstruct different amounts of light from reaching the color filters, a time-distribution approach could alternatively be employed to achieve a similar result—where for example the black droplet might only have two possible positions: (1) totally obscuring the color filter; and (2) not obstructing the passage of any light onto a particular color filter.

In such an approach, by changing the ratio of time duration between the above two different states, it is possible to controllably vary the perceived intensity or amplitude of light of the color of that particular color filter that is emitted by the system. Clearly, by applying this approach to more than one filter of different colors, it is possible to controllably vary the perceived average color, or intensity, of a pixel, for example, on a screen display system.

It should also be understood that although, in the following document, I have used color filters as an example of the means by which the change of shape or location of a light-obscuring/light absorbing/light reflecting measure of liquid can vary the amplitude or light passing onto or through said color filters, the same approach may alternatively be employed in respect of any surface or plurality of surfaces incorporating a space distribution of different light-modulating properties or different light frequency converting materials, where said change of location or shape of said measure of liquid due to electrowetting effect causes a change in the amplitude or intensity or other properties of light passing onto one or more locations within said space distribution of different light-modulating or frequency-converting areas incorporated within a device.

It should be noted, thus, as an example, that this approach may be employed to controllably modulate the amplitude (or other properties of light) of (e.g., ultra-violet, or near-UV) light passing onto different florescent or 'down-converting', or light frequency-converting materials, so as to controllably modulate the colors, or light intensity, or other properties of light which emerge from such a system.

In such an arrangement, for example, the amplitude of ultra-violet light (if that were the exciting frequency, for example) being allowed to reach different light-frequency converting materials due to the EW-achieved change of shape or location of such measures of liquid can be controllably modulated—thus causing, for example, a corresponding change of emitted colors of light by said frequency-changing materials due to different amounts of light reaching each of a number of different such materials which convert light into a different, (usually visible) frequency or color of light.

This principle is applicable to all of the inventions described here. Similarly, instead of a range of different frequency-converting materials emitting light of different frequencies or color due to their innate frequency of light or light-converting properties, as merely another of almost innumerable possible examples of the same principle, said space distribution of different light-modulating properties might be one or more surfaces which refracted or reflected the incoming light in different directions, or with other different light-modulating effects: thus, by changing the shape or location of a measure of liquid due to electrowetting effect—and thereby changing properties of light reaching different locations of such angle-of-light-changing surfaces (or other light-modulating properties—the respective ratio of light which was reflected or refracted (for example) by the different surfaces would be controllably modulated.

Thus, to be clear, taking FIG. 1 as an example, said green, red and blue color filters might instead be different light frequency-changing, or for example 'down-converting' materials—and by changing the location or shape of the droplets shown, we are able to modulate the amplitude or intensity (or other properties) of light (e.g., ultra-violet light) which reaches those light frequency-changing materials.

Finally, it should be understood that whilst in the following examples 1 have given the droplets' color as being black, they could alternatively have been of any other color—thereby, for example, providing the means of themselves modulating the color or other properties of light passing onto or through said (for example) color filters.

Equally, it should be understood that such measures of liquid as are being change in location or shape—directly or indirectly, or 'passively or 'actively' as described above—by electrowetting effect could themselves include, or incorporate, florescent or light frequency-converting materials.

Figure 2:
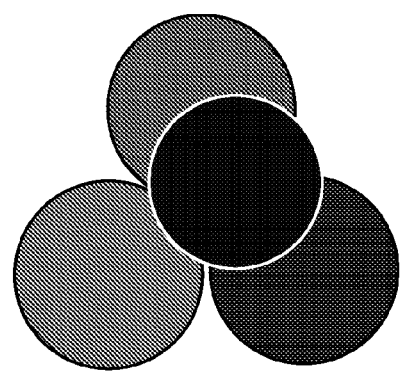
FIG. 2 shows an embodiment where a single black-colored droplet is disposed over different color filters.

FIG. 2 shows a different but related approach, where a single black-colored droplet is moved in respect of a number of different color filters. Optionally, in this approach, the location and/or the size of the droplet can be changed by electrowetting effect (i.e., the cross-sectional profile, or area of droplet/surface contact can be modulated by electrowetting effect—thus changing its total area in contact with a hydrophobic surface where said hydrophobic properties in respect of said measure of liquid have been changed by electrowetting effect). The various means of employing electrowetting effect to change the shape and/or the location of droplets are well-known to those skilled in the art—and are in addition discussed in my existing published US patent on electrowetting display means.

In essence, however, such methods employ electrodes located adjacent to the droplet(s) in question to create an electric field, which in turn causes a change in the surface energy relationship between one or more droplets on the one hand, and the hydrophobic layer or material with which the droplet comes into contact on the other.

An increase in electrical potential applied in such an approach typically causes a hydrophobic surface to become less hydrophobic—or to become hydrophilic—in respect of such a droplet. Thus, by causing a surface adjacent to a droplet to become less hydrophobic in respect of a droplet (e.g., a polar droplet) due to electrowetting effect, said droplet can be induced to change location to position itself in contact with that location adjacent to an electrode which is less hydrophobic in respect of the droplet than surrounding adjacent locations on the surface along which said droplet is able to move.

The same basic approach can be employed to change the area of contact between the droplet and the surface—as is similarly well-known to those skilled in the art. Bruno Berge is credited with conceiving such a system for the purpose of achieving variable focal length liquid lenses.

A 'color wheel', or any other suitable multi-color filter arrangement, could alternatively be used, where the black droplet is moved controllably in front of the wheel to block selected portions of selected colors. The particular size of the droplet shown does not suggest an ideal size for this droplet, and is used purely for illustrative purposes.

With reference to the alternative 'windows' approach described in this document (see below), where instead of blocking or obstructing light, the droplet (e.g., a polar or conductive droplet) is more light-transmissive, or allows more light to pass through it, or has different light-transmitting or light-modulating properties from, a second liquid with which it is mutually-immiscible and in contact (e.g., a non-polar liquid), it should be appreciated with reference to, for example, FIGS. 2 and 3, that such a 'window droplet' could replace the shown 'black droplet' in these drawings—and wherever the droplet was located, the light would pass through it and onto or through the filters (or other light-modulating or frequency-converting materials or items)—and wherever the droplet was not located in respect of the aforementioned items or filters, light would either not be able to pass onto or though them (because, for example, the second—e.g., non-polar—liquid might either block or totally obstruct or absorb the light) or because the 2nd liquid would be less light-transmissive, or would have different light filtering properties from the first droplet.

Clearly, such a 'window droplet' could be changed in either its location or its total area of contact (thus its size) by electrowetting effect. Thus, in the most simple 'clear droplet in black 2nd liquid' example, we would effectively be looking at a hole through which light can pass, and which can be expanded or contracted in area, and which can be changed in location along a hydrophobic surface in respect of the different elements upon which light will pass, having passed through the 'window'—and this 'hole', or light path, would in this example be surrounded by a black, or light-reflecting area (the second liquid) through which it could not pass. Thus, we would have a very flexible and innovative light-modulating system for selecting which items in a space distribution of different light-modulating for light frequency-converting items light passed onto or through at any time In FIG. 3, the black liquid droplet has increased in size, and is now largely obscuring most of the light coming from/going to the red and green color filters, with the result that now the light emerging from the system will be a different color, composed of more blue than red or green.

From the above, it is clear that by moving, —and/or, optionally, changing the size of—a liquid droplet which prevents much or all light falling on it from penetrating it, we can control the color of the light emerging from the system.

It should also be pointed out that if a 'color wheel' type of multi-color filter is used, a special layout of the different colors in the visible spectrum could be provided that would enable a single dark-colored droplet of fixed size to provide the greatest possible number of color combinations to the display, by blocking appropriate areas of the 'color wheel' filter.

In the above example—as in many of the other approaches described in this, and my U.S. Pat. No. 6,924,792—the droplet may be used on its own, sandwiched between two substrates, at least one of which must be transparent or translucent, or it may be located together with a 2nd liquid or fluid—where, typically, such different liquids (e.g., polar and nonpolar, respectively) would be mutually-immiscible.

Elsewhere in this document, a similar approach is used, with the difference instead of employing one or more measures of liquid that function to obstruct, or reflect some portion of light from passing onto a particular sector of a space distribution of different light-modulating elements (e.g., color filters), and thereby to control the (e.g.) color of the light which emerges from such a system, instead one or more measures of liquid is used to perform a kind of inversion of this approach—i.e., that more light passes through, for example, a droplet than passes through liquid (typically mutually-immiscible with the first liquid) which is surrounding the first liquid.

In this way, the droplet acts as a type of 'window' to permit light (or a greater amount of light, for example) to pass through it than passes through the surrounding liquid.

Thus, taking an one example of an application of this principle, if a transparent droplet were located adjacent to a number of differently-colored color filters, then by employing electrowetting effect to change the position or size of that droplet, the amount of light which passes through that droplet and passes subsequently onto or through the differently-colored filters can be controllably modulated—thus providing a novel color display or dynamically color-changeable light-projection means.

Equally of course, this 'window' approach can be used to control the amount of light, or alternatively other properties of light, which passes onto any space distribution of different light-modulating or light frequency-converting filters or materials located adjacent to said liquids.

Thus, as an example, ultra-violet (or near ultra-violet) light might be employed as a light source, with one droplet under electrowetting control allowing that light to pass through to selected frequency-converting materials located on the other side of the droplet from the light source—and another liquid, typically mutually-immiscible with the first liquid, may prevent such light from passing onto such (e.g.) 'down-converting' materials of different properties located on the other side of the droplet from the light source, and within the same space distribution of such different light frequency-converting materials.

By this means, it is possible to controllably modulate which different light-modulating materials, filters or other elements are illuminated by the light source—and also to control the respective amplitude of light which passes onto such different light-modulating items or materials at any one time. Time distribution techniques may be employed, optionally, to controllably modulate properties of light which passes onto such different filters, frequency-converting materials or elements.

Several of the droplet-moving systems described in my previous patent applications show how liquid droplets can be controllably moved over a surface, and how this can be used for display, light-projecting, and/or dynamic color-changing (of emitted light) purposes.

However, to refresh the reader's memory, I shall now give one or two examples, applied to this particular application of droplet-moving techniques, wherein the function of the droplet is to selectively prevent, or reduce, the amount of light that has, or will, pass through different color filters (or other items, as described above), and thereby controlling the color or other properties of light that will exit the system.

Figure 4:
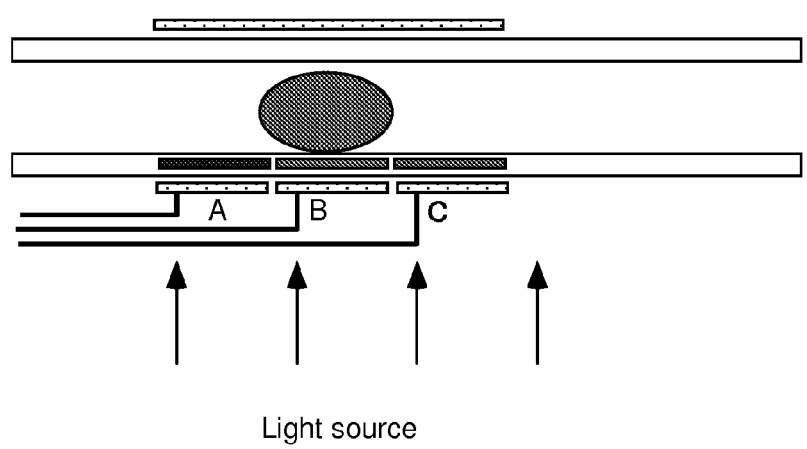
FIG. 4 is a schematic cross-section showing an exemplary a cell/pixel.

In cross-section, FIG. 4 is a drawing, simplified for the purposes of clarity, showing one of many possible ways that the system could be arranged for one particular cell, or 'pixel'. In this particular approach, three electrodes are located below a substrate or layer which—at least in the absence of electrical potential being applied to one or more of the electrodes shown—is hydrophobic in respect of the black droplet shown. A ground plane is shown located above another substrate located above the droplet.

Thus, in this simple example, by applying suitable electrical potential to electrodes A or C (since the droplet is currently located above electrode B) and with no potential applied to electrode B), an electric field can be created which causes an electrowetting effect to cause the droplet (e.g., a polar droplet) to be induced to locate itself above the electrode to which the electrical potential has been applied—thereby reducing the amount of light which would pass upwards (in the above diagram) through the particular color filter which is being partially or wholly 'blocked' from the light source by the droplet.

In the above type of arrangement, transparent electrodes, or conductive material, (e.g., ITO) may optionally be used; alternatively, non-transparent electrodes may be used, where they are so shaped that light passes through areas not occupied by the electrodes; optical lenses, for example, may be used as described in the prior art to focus or direct light through 'holes' or slots in the electrode areas.

It should be noted that drawings herein do not generally show lenses and other optical arrangements or electrical arrangements (e.g. electrodes or address lines, etc), many of which have been alluded to in the prior applications and other prior art, since the concern here is to introduce the principle of moving droplets to as to selectively modulate properties of light passing onto or through different items in a space distribution of such items, rather than covering optical and electrical, and particular electrowetting configurations and techniques, which are well-known to those skilled in the art, and are documented in prior art.

Almost innumerable alternative arrangements of the electrodes can be used, the options for which are well-known to those skilled in the art. Almost any practical number of electrodes could be used, for example, beneath the lower substrate layer shown above, and any appropriate number of them could be charged with all the same, or different, polarities—with or without the use of the electrode above the upper substrate acting as a ground plane, or as a counter-electrode—so as to produce a very large number of different possible fields, or combinations of electric fields, acting on the droplet.

Thus, the droplet may, for example, be distorted in its shape, either in terms of the profile (cross-sectional view) and/or its shape when viewed from above, in terms of the drawing above. In combination with a suitable pattern of color filters, and/or a suitable pattern of wetting surfaces on the inner face(s) of the substrates, a vast number of possible positions and shapes for the droplet can be controllably achieved.

In U.S. Pat. No. 6,924,792, the possible use of one or more resistant electrodes was discussed as a means of controlling the location of the droplet.

Figure 5:
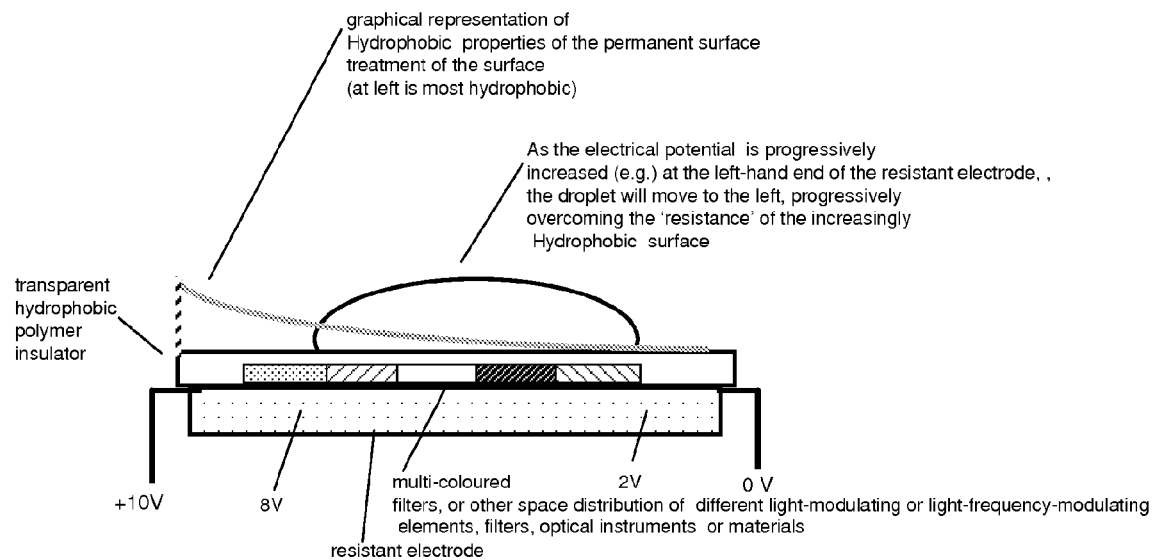
FIG. 5 shows a simplified drawing of a resistant electrode used to change the location of a droplet by electrowetting along one axis.

FIG. 5 shows a simplified drawing of one means by which a resistant electrode could be used to change the location of a droplet by electrowetting means along one axis (though the same approach is applicable to more than one axis), by creating electric fields of different strengths at different points along the hydrophobic (at least, hydrophobic in the absence of an electric field, and subject to the other methods discussed in this document for a permanent treatment of the surface with a space distribution of different hydrophobic properties) substrate surface adjacent to those sectors of the resistant electrode.

In some approaches, a permanent pre-treatment of one or more of the surfaces with which the droplet is in contact may be applied to produce a gradient of progressively increasing hydrophobicity may be employed—as shown in the diagram.

FIG. 5 provides a simplified, graphical illustration of this point. It should be noted that this, and all other methods of controllably moving or manipulating droplets discussed herein or in earlier applications, are equally applicable to droplets which are designed to be light-obstructing, or are dyed, or are acting as 'liquid lenses', or are, or incorporate, materials with properties to convert, or 'down-convert' the frequency of light which passes onto them, or are acting as vehicles to carry solid lenses or other optical devices (see more, below). Equally, light-obstructing droplets may optionally be located within other, non-immiscible, liquids.

Depending upon the particularly configuration of the device and its particular purpose, a second electrode, which may be a second resistant electrode, or may be a conventional electrode, may be provided 'above' the droplet in the diagram below, to provide a difference of electrical potential between different points along one or both electrodes—thereby governing the strength and distribution of electric field between the two electrodes—and thereby governing the distribution of hydrophobic properties along one or more surfaces with which the droplet is in contact.

FIG. 5 is only provided for the purposes of example: there are many alternative means of controlling the distribution of electric field—and thus the hydrophobic properties at different points along one or more surfaces due to electrowetting effect—that the general principle of the resistant electric can be employed to achieve. As is explained above, whereas different color filters are shown in the diagram, these could be replaced with a space distribution of any range of different light-modulating properties, or light frequency converting materials with different frequency-converting properties.

Clearly, it is, optionally, possible to provide duplicate resistant electrodes on the same axis both below and above the droplet; it is also, alternatively or complimentarily, possible to use this principle in more than one axis, so as, for example, to provide 2-axis movement of the droplet to whatever location is desired so as to block different amounts/proportions of light from passing from or to the different color filters, and onwards to the viewing screen—i.e., to whatever proportion is desired in the case of each filter—and thereby to determine the color of light emerging from the system.

Clearly, such an approach, employing electrowetting effect, can also be used to change the location or shape of droplets used to provide functionality other than 'light blocking'—e.g., droplets directing (e.g., focussing, or reflecting) light towards selected color(s) or a space distribution of different light-modulating or frequency-changing properties, and so on.

Figure 6:
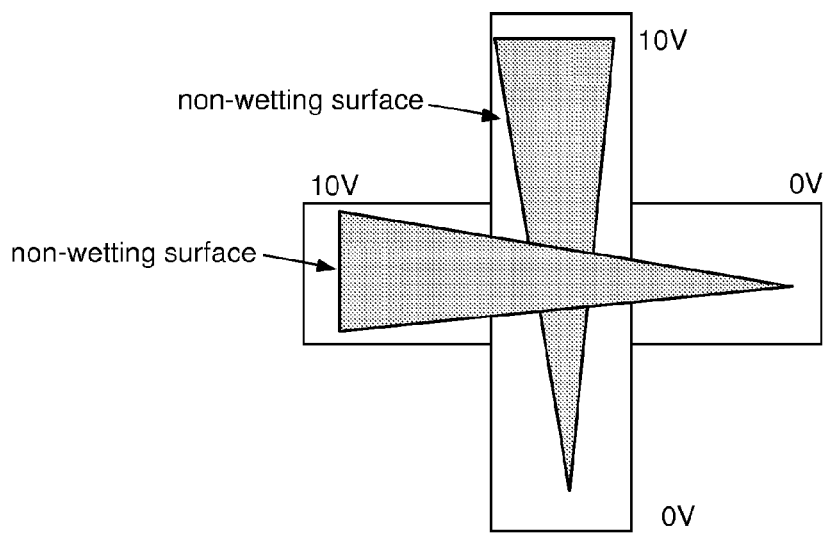
FIG. 6 provides a graphical representation of a '2-axis resistant electrode' approach.

FIG. 6 provides a graphical representation of the '2-axis resistant electrode' approach: here, the shape of the resistant electrodes has been distorted for clarity, and the blue triangles represent increasingly non-wetted surfaces adjacent to the higher voltage ends of the respective resistant electrodes.

Figure 7:
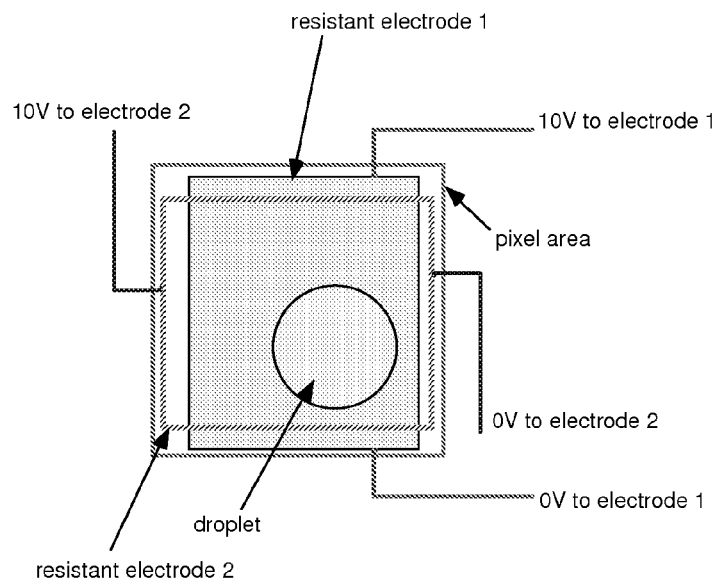
FIG. 7 shows a plan view of an exemplary 'pixel' of a display employing the movement of a droplet.

FIG. 7 shows a different (simplified) representation of such an arrangement. As with other diagrams herein, only elements of the design relevant to making the current points clear are shown in the drawing.

In FIG. 7, we are looking down (plan view) on one possible arrangement of a 'pixel' of a display employing the movement of a droplet. The brown square represents the substrate area; the turquoise rectangle is a resistant electrode (say) immediately underneath the lower substrate, and the rectangle marked with a dotted line is another resistant electrode, which may be located immediately adjacent—above or beneath—the first, or in another alternative approach, is located above the top substrate of systems such as those shown above.

Figure 3:
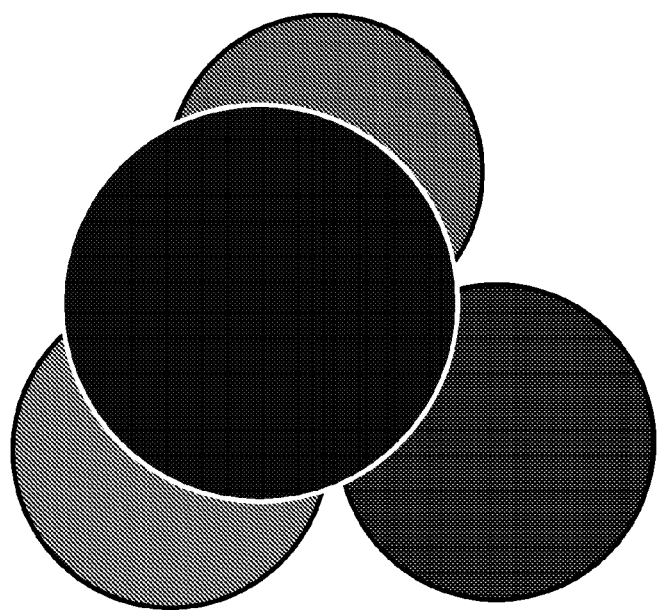
FIG. 3 shows an embodiment in which a black liquid droplet has increased size and largely obscures red and green color filters.

The important point here is that by arranging the two resistant electrodes so that they are, for example, at right angles in orientation to each other, we are able to use the 'resistant electrode+ varying surface wettability' approach described above to control 2 different axis of movement—and thus to move the droplet to wherever we wish, or to change its shape in many different possible directions, or to achieve blocking, or 'controlled passage of light' by the 'window approach' described in this document—of whatever colors or other space distribution of light-modulating or frequency-modulating elements is desired, as shown in FIGS. 2 and 3 above, or to focus, or reflect, light onto different filters or other of the aforementioned light-modulating or frequency-changing items, so as to control the colors, or other properties of light, emerging from the system.

The voltages shown in the drawing are merely given for illustrative purposes, to show that there is a voltage difference applied to different points, or ends, or sides, of the electrodes.

With respect to the resistant electrode arrangements discussed above, it should be said that of course these only represent one example of how to control the location of the droplets: there are innumerable other ways, using techniques well known to those skilled in the art, of applying the necessary electrical potential or voltage to move the droplets to the desired location—some of which are described in my U.S. Pat. No. 6,924,792. But whereas most—if not all—other approaches for achieving many different possible locations for the droplet rely on many different, often separately-addressable electrodes, the great advantage with the resistant electrode is that it keeps the number of address lines very low.

One optional possible arrangement of the resistant electrodes shown in the above diagram, for example, would be to locate one above the upper substrate (i.e., above the droplet in cross-sectional terms), and the other below the lower substrate.

Figure 8:
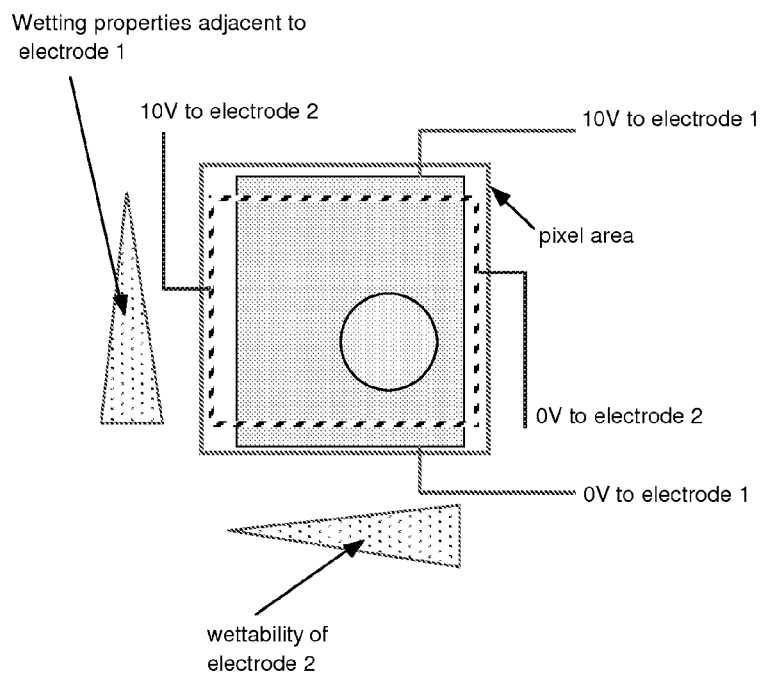
FIG. 8 shows how the wettability gradients, or gradients of hydrophobic properties, could be arranged for a system as described in FIGS. 6 and 7.

FIG. 8 shows how the wettability gradients, or gradients of hydrophobic properties, could be arranged for a system as described in FIGS. 6 and 7. However, it should be understood that the scope of claims within this patent with respect to resistant electrodes are not in any way limited to this type of electrode being used in combination with one or more gradients of wettability or hydrophobic properties: these are provided only for the purpose of illustrating one method of employing resistant electrodes to change the shape or location of measures of liquid being changed in shape or location by electrowetting effect.

In FIG. 8, the two red triangles represent the gradient of hydrophobic properties in respect of the droplet in the 'north-south' axis (in respect of electrode 1), and in the 'east-west' axis, in respect of electrode 2. The application of a wettability gradient—say, screen printing, for example—of the inner faces of the two substrates could be executed, for example, by only applying the gradient in one axis for each substrate respectively.

Alternatively, of course, the varying hydrophobic properties on the relevant substrate surfaces (i.e., those within which the droplet is in contact, or may come into contact) could optionally be applied in both axis on either or both surfaces or in both axis for both substrates, etc. Thus, for example, a surface facing and immediately adjacent the droplet could on the same face of a single substrate (using points of the compass metaphorically) increase wettability from East to West, and also increase wetting from a lowest level at North towards a highest level at South.

It should be pointed out here that while FIGS. 2 and 3 show red, green and blue color filters arranged in a triangular format, there is no real limit to either the choice of the number, or the color of the color filters in systems where the droplet is providing a 'color-blocking' or light-focussing, or 'controlled passage of light' via the 'window' approach described herein function, nor in the arrangement of how those colored filters are arranged in respect of each other, or in respect of the droplet. A 'rainbow-like' line, for example, incorporating many or all colors in the visible spectrum could be laid down, and the droplet could simply move up and down that 'spectrum line'.

Equally, there could be more than one droplet employed for one or more filters or other elements or locations within a space distribution of different light-modulating or frequency-converting items within (for example) each pixel of the display: the droplets could be separately addressable—due, for example, to the material of which they are composed (as for example those discussed in my existing published electrowetting US patent) or, for example, because separately-addressable electrodes control different droplets confined within different areas of the pixel color filtering system that do not encroach on, or 'overlap', each other. Thus, there could be, for example, one black-dyed droplet for each of the R, G, and B filters.

Interestingly, another way of controlling the location (or indeed area) of multiple droplets with respect to more than one color filter within one 'pixel' or cell of the display with the minimum number of address lines leading to each 'cell' would be to employ the variable wetting patterning of the hydrophobic substrate(s) discussed in this and the previous applications.

Thus, a single cell of the display, containing (for example) two droplets functioning (say) as light-blocking droplets, could have different voltages (respectively, for example with regard to the potential applied to each end of each resistant electrode) applied to each end of two different 'zones', within which there would be one droplet contained within each zone by variable wetting 'energy barriers'. If all the colors in the visible light spectrum were, for example, distributed in an appropriate layout across each of the two zones, then by independently manipulating the voltage differences supplied to each end/side of each resistant electrode, it would be possible to achieve most, if not all, of the possible color combinations with two droplets.

The ability to control the size of the droplet (by, for example, increasing the electrical potential applied to appropriately-positioned electrodes so as to increase the 'flattening' effect on the droplet by known electro hydrodynamic or electrowetting means where, for example, the droplet is located within another appropriate liquid) means that we could, if desired, make an arrangement whereby there was one droplet adjacent to each of (say) the three primary colors red, green and blue in such a location as to block/obstruct (or filter, or use the 'window' approach described herein to allow controlled amounts of light to pass through a droplet) a desired portion of the light passing from that filter (or other light-modulating or frequency-changing material or item) to a display screen, or to projected—or for other light-modulating purposes.

By expanding or contracting these (e.g.) light-obstructing droplets, we are able to determine the color of the light emerging from the system.

Figure 9:
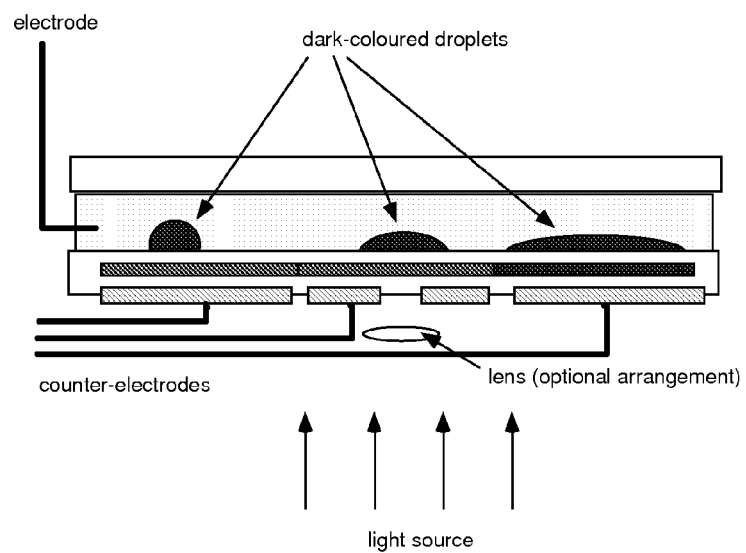
FIG. 9 shows size variations produced in light-obstructing droplets.

FIG. 9 illustrates this principle. In this particular example, one electrode is inserted into an electrically-conductive liquid (an electrolyte) 'surrounding' droplets (e.g., oil droplets) with which the electrolyte is immiscible.

As the applied potential or voltage differential between that of the electrode in contact with the electrolyte and that of an electrode underneath the (hydrophobic) substrate is increased, the droplet will 'flatten' itself, as shown in the diagram below. Of course, although the diagram below shows such an approach being used in a light-emitting system, it could also be used in a light-reflecting system—employing, for example, ambient light. Equally, of course, this example of an electrolyte and oil droplets could be replaced with polar droplets acting as the (for example) light-blocking droplets—as is shown in prior art, including my own US patent.

Thus, taking FIG. 9 as an example, if there were no light sources underneath the lower substrate, but instead, the lower substrate (or one or more surfaces underneath that substrate, if the lower substrate were transparent or translucent) could be light-reflecting, and the change in size (or in other approaches, the location) of the (e.g.) light-obstructing droplets would serve as a controllable means of modulating the respective intensities (or other properties of light) of light able to pass onto, or be reflected by, the respective different light-modulating elements in question (in this example, red, green and blue color filters).

Figure 19:
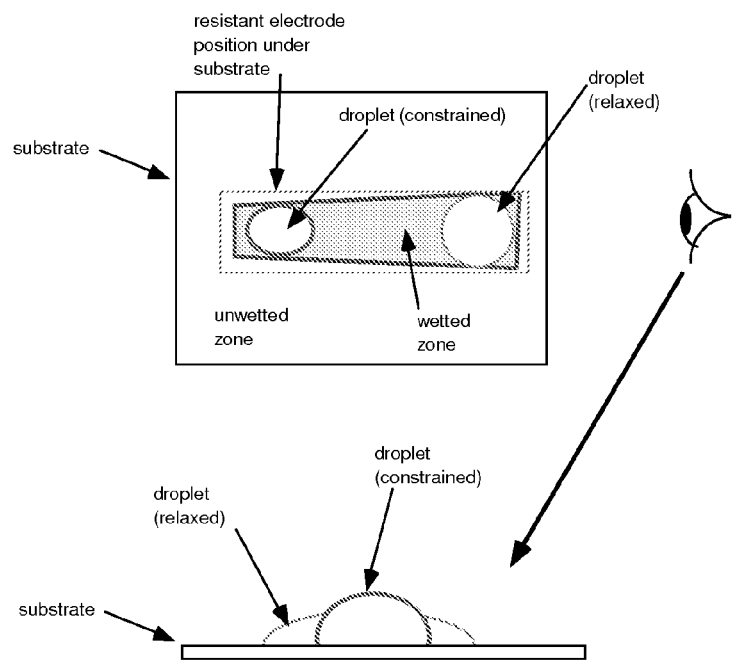
FIG. 19 shows an exemplary embodiment of a system that dynamically modifies the profile (and thus the liquid-solid contact area) of droplets above each of the 3 color filters shown in FIG. 9. This way it is possible to control the amount of the color that passes through the system onto or from each filter and thereby to control the color of light emerging from the system.

In the particular example given here, it is clear that provided the (e.g.) black-colored droplet is at least largely non-permeable by light—even when it is 'flattened' by electrowetting and/or other (e.g., electro hydrodynamic) droplet shape-changing effects—then by dynamically modifying the profile (and thus the liquid-solid contact area) of the droplets above each of the 3 shown color filters, it is possible to control the amount of the color that passes through the system onto or from each filter—and thereby to control the color of light emerging from the system. Clearly, as an alternative arrangement to that shown above, the black droplets could have been any color or of any desired light-modulating properties, and could for example alternatively have been located beneath (in terms of the diagram) the color filters, to achieve similar functionality. See FIG. 19.

As is well known to those skilled in the art, there are many other methods and arrangements for changing the curvature of a droplet surface, or the angle at which the droplet meets the substrate beneath it, other than the arrangement shown above, which is provided merely as an example of one possible system. (The droplet could, for example, be electro hydrodynamically (including by means of electrowetting effect) induced to move sideways along the surface shown, thereby, for example, bringing it into contact with an area of the substrate where a wetting pattern induces it to spread itself more widely—thus, in this important example, the permanent pre-treatment of the surface upon which the droplet moves or changes shape is of different hydrophobic levels at different locations along its surface; thus, if the droplet were induced due to electrowetting effect to change location to a location where the permanent hydrophobic level is relatively lower than the surrounding areas, then the droplet could be caused to expand its contact area with the surface at that location.

What is claimed here is any suitable means of changing the location on a surface, or the total area of liquid-solid contact, of a droplet by varying the electrical potential applied to one or more electrodes proximate to that droplet (whether electrically insulated from it, or with one or more other mutually-immiscible liquid(s) or fluid(s) surrounding liquid it or not), where such a change of location or area caused by electrowetting effect or other electro-hydrodynamic means provides the means by which that change will serve to modulate, in a controllable manner, the amplitude, intensity, or other properties of light passing from one or more light sources (including ambient light) onto one or more light-modulating or frequency-converting items within a space distribution of such elements which are incorporated within that device.

It should be noted that the middle electrode in the FIG. 9 has a 'hole' in it: this example of one possible arrangement or shape for an electrode is provided simply to illustrate that, optionally complimented by one or more suitably-positioned optical lens (or lens arrays) [shown], a transparent electrode (such as ITO, etc.) is not necessarily required.

In relation to electrodes, it should of course also be noted that although FIG. 9 shows an electrode introduced into a second liquid which is an electrolyte (where, for example, the location or shape-changing droplet shown could be a non-polar liquid immiscible from the electrolyte), this particular approach is only shown in the diagram for illustrative purposes on one possible means of applying the principles detailed herein: many other well-established configurations of different one or more liquids and differently-arranged electrodes—as shown in my existing US patent, for example, and in other prior art could equally be employed to achieve similar functionality. Thus, for example, there could have been a ground electrode placed above or within the top substrate, and the mobile liquid droplet could have been a polar liquid—with, optionally, a non-polar liquid surrounding it.

In conclusion then, the purpose of the above discussion and examples is to demonstrate a few of many possible arrangements whereby the surface profile (i.e., the cross-sectional shape, or the liquid-solid contact area), or location, of droplets in a suitably-configured electrowetting or other electro-hydrodynamic light-modulating device can be used to selectively block light from passing onto, or controllably allow modulated amount of light to pass onto, different elements are areas within a space distribution of different light-modulating or light frequency-converting elements or materials, so as to controllably modulate the color or other properties of light emerging from such a light-modulating or display device.

It should also be understood that while the diagrams referred to above have shown droplets located above color filters, and in turn illuminated from underneath, there are clearly many other possible arrangements of the light source, filters and droplets, the electrodes and addressing means, and the presence or absence of light-reflecting surfaces, and the use or non-use of time-distribution systems which employ the same principles as are described here.

It should also be noted that light-blocking systems exampled by some of the above drawings can also be used where the light source is in front of the display, and a light-reflecting surface is located, for example, behind the droplet array. Thus, for example, in FIG. 9, above, by expanding or contracting droplet's total area (as described above), the apparent color of a multi-pixel array, when viewed from a certain minimum distance necessary to allow the eye to perceive a 'composite' color, and from a suitable range of angles, can be controllably changed. Finally, although black droplets have been used as an example of a means of obstructing or absorbing light, such droplets could alternatively be of any color or light-modulating material—e.g., they could have been light-reflecting, or of light frequency-converting materials, or incorporating such materials within their volume—whether in a uniform distribution, or otherwise.

'Wobbling' Droplet Approach

Figure 10:
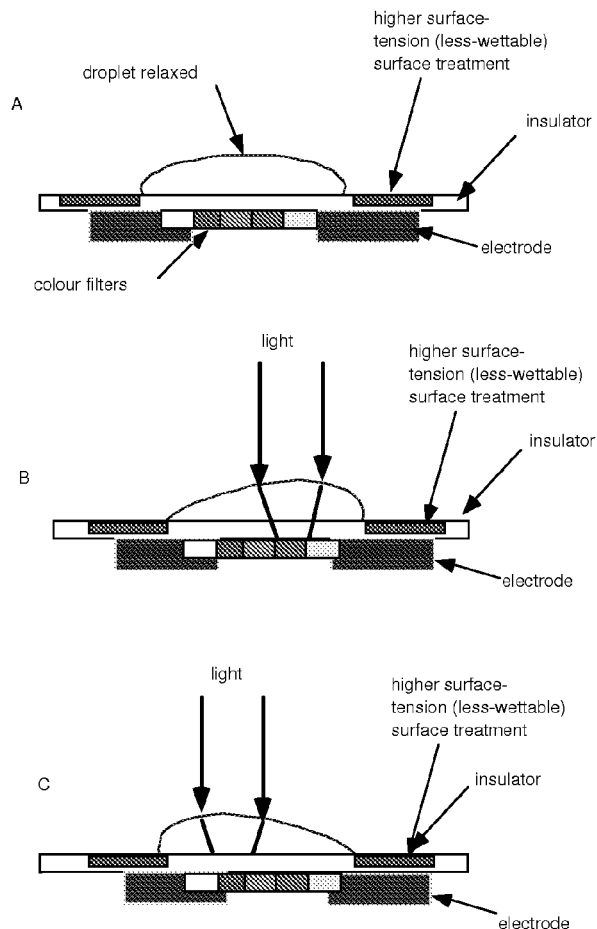

In my earlier patent application, I described a droplet-manipulation approach employing electrowetting effect where by varying the electrical potential applied to two or more different electrodes, it is possible to distort the shape of a droplet—and therefore its light-diffracting properties. FIG. 10 shows one example of such an approach, as was shown in my existing US patent on electrowetting devices.

It should be pointed out here that this 'controlled wobbling' of the droplet can be used not only in one axis, but also in two axis, if desired, by, for example, 'crossing the electrodes' as explained elsewhere herein.

It should be understood, with reference to FIG. 10, that the actual respective locations and positions of the elements within the above drawings are given only to illustrate the principle being introduced here—they are not intended to be accurate in any way. It should also be understood, with reference to the marked areas to the left and right-hand side of the droplet which are of higher hydrophobic properties than the other surfaces with which the droplet can come into contact, that clearly the materials employed to achieve this higher hydrophobic property must be so configured—in addition to the positioning of the electrodes shown, crudely, as being underneath these areas—so that, optionally, said areas retain some hydrophobic properties in respect of the droplet notwithstanding whatever electrical potential is applied—thus, they continue to 'resist' the presence of the droplet above them, even though a potential is applied to the adjacent electrode. Thus, the adjacent electrode may, for example, be located further to the left (in respect of the right-hand electrode) than is actually shown in the diagram above—so that the hydrophobic properties of the marked more hydrophobic areas continue to resist the presence of the droplet above them.

Fundamentally the same approach can be used with a droplet in a container, where we seek to change the curvature of the top (and/or bottom) surface of a droplet or measure of liquid.

Figure 11:
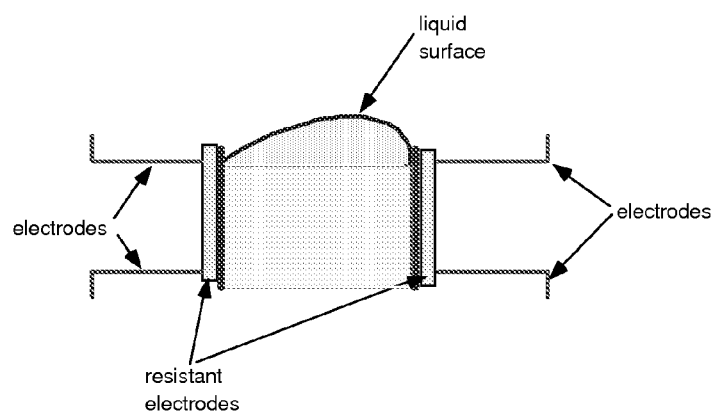
FIG. 11 shows an exemplary embodiment of an apparatus that employs an electrowetting effect to distort a droplet.

FIG. 11 shows one of many ways of achieving a purpose similar to the diagram above, but where the electrodes are located at the side of the container of the liquid. As in all the electrowetting devices described in this document, the electrodes shown would in EWOD approaches be electrically insulated from the liquid shown—but this is not necessarily the only approach, and this patent includes, in the case of all electrowetting devices described herein, that such devices alternatively do not incorporate an electrical insulator between such controlling electrodes and any particular liquids.

In FIG. 11, I have shown resistant electrodes being used—although clearly a similar effect could have been achieved using a number of separately-addressable electrodes. It may be assumed for the purposes of this diagram that the electrodes shown at the right of the drawing are electrically insulated from those on the left, and are in this example oppositely-poled.

If we assume that the electrodes to the right and left of the liquid shown are resistant electrodes, then it will be appreciated that by modulating the voltages applied to different electrical connections to different locations on the respective electrodes, the cross-sectional profile of the top surface of the liquid, for example, can be controllably modulated.

It should be noted that an alternative to the system shown in FIG. 11 would have been to have arranged one or more circular resistant electrodes (like lengths of a hollow tube, within which the liquid is contained, and where the liquid is electrically insulated from the resistant electrode(s)). By this alternative means, we would have been able to manipulate the cross-sectional profile of the top surface of the liquid in a different axis. More than one such ring-shaped resistant electrodes surrounding a liquid could optionally be employed for many other possible purposes—including for example to provide a means whereby elements or particles (for example, light-refracting or light-reflecting particles or optical instruments) located within the liquid could change their location, orientation or angle due to modulation of electrical fields created by the modulation of potentials applied to different locations on different resistant electrodes such as those shown in the diagram, thereby serving, for example, to controllably modulate properties of light passing through the liquid.

Figure 12:
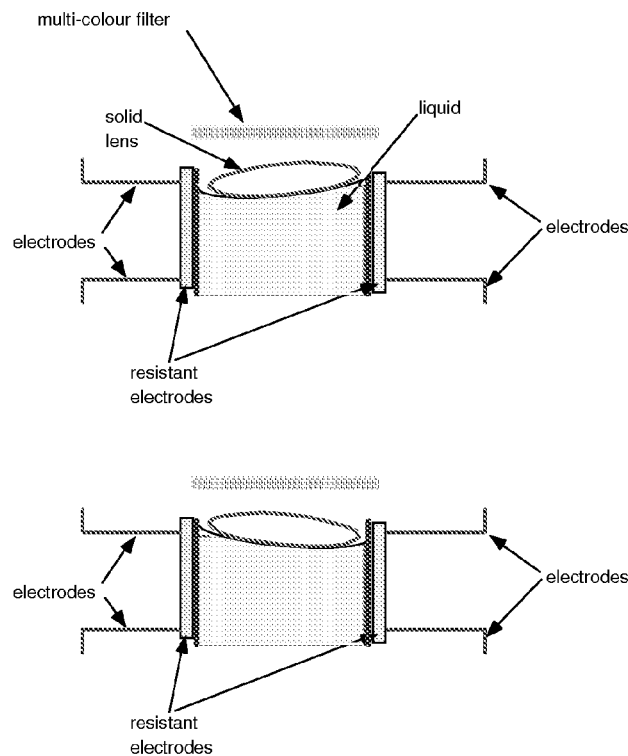
FIG. 12 shows an exemplary embodiment of an apparatus that employs an electrowetting effect to distort a droplet and that includes a solid lens.

Clearly, the same approach can be taken where a solid lens or other optical instrument 'floats' on (in this example) the upper surface of the liquid, as is illustrated in FIG. 12, for example.

One application of the approach shown in FIG. 11, for example, is to provide a dynamic light-modulating means employing electrowetting effect—which could be used, for example, so that it operates as a different kind of variable focal length lens than is currently available. If both the top and bottom surfaces were manipulated by means such as those described, then clearly the optical potential of the device expands considerably!

In FIG. 11, the use of a resistant electrode also provides another interesting possibility: namely, that of inducing by electrowetting means one or more measures of liquid to move to different locations within (for example) a tube. If there were, for example, two separate measures of liquid subject to electrowetting effect located within a tube with some distance between them, these measures of liquid could be separately moved, or changed in shape (and thus optical performance) with respect to each other. Thus for example if the distance between the two droplets or measures of liquid was changed by electrowetting effect, that would (among other potential uses) thereby provide a new type of liquid zoom lens arrangement. Of course, optionally, more than 2 separate (or separately-addressable and mutually-immiscible) such measures of liquid could be employed for additional functionality.

The focal length of the two different and separate measures of liquid could be dynamically modulated by, for example, changing the cross-sectional profile of their surfaces by the means described here and in my existing US patent on electrowetting devices, thereby enhancing the zoom/light-modulating capabilities of such a system. The use of resistant electrodes in such a device would be very attractive, as it would provide the means of achieve the aforementioned functions without the need for a number of different, separately-addressable electrodes to (for example) induce the change of location of one or more measures of liquid within such systems.

In this example, the surface of liquid may be simply convex, but due to different electrowetting forces at play in the top and lower sections of the drawing below (due to the different voltages(s) applied to the different ends of the resistant electrodes shown, as described elsewhere herein), the lens could be controllably 'tilted' at different angles by the employment of electrowetting effect and biasing techniques such as are described in my existing US patent on electrowetting devices.

Clearly such 'tilting' techniques can be far more sophisticated that merely tilting in one axis, as is implied by the drawings below. More separately-addressable electrodes, for example, could have been provided in the 'sleeve' around the container shown in the drawings above and below here—or of course a resistant electrode approach could have operated in two axes, instead of the one axis approach shown here.

FIG. 12 shows a similar device to that shown in FIG. 11—but with a solid lens being additionally supplied to the system. For the purpose only of illustration of one or many possible applications of such a system, a multicolored filter has been added to the drawing—so as, for example, to change the color of light departing from such a system.

The particular design shown here suggests that any light source employed in a system similar to this one shown would be located beneath the container shown. However, clearly there are almost innumerable possible arrangements of lenses, reflectors or other optical instruments (with for example the latter two classes replacing the lens shown) which could exploit this basic idea.

If we stay with the instrument being a lens, and a multi-colored filter being the two elements in the system (instead of innumerable other elements exploiting the same principle would could optionally have been employed instead of these two items) as an example, the multi-colored filter could optionally have been located below the liquid container shown, and a reflective surface located beneath that, so that it then would becomes a reflective display. (Obviously, the container shown is purely to illustrate the principle here—in this particular example, the container might be extremely shallow to increase its performance for this particular function).

Or as just one of so many other possible employments of the same principle, the system shown above could be located above each of a number of differently-colored filters—say, R, G B—so that by tilting the lenses, different portions of the light passing through the filters from, say, a light source beneath the filters would be allowed to pass on to the display screen—the remainder being diverted on paths which would not reach the screen. And so on.

Equally of course, with other optical instruments or items within or on the surface of the liquid, different effects could be caused to take place by employment of the same fundamental idea—for example, if the solid lens shown in the drawing were instead a light-reflective element—e.g., a minor—and the light source was instead above the device, then clearly the incoming light could be reflected at different angles onto other optical instruments—e.g., color filters, other reflectors or lens, prisms, etc.—or simply back out to the world.

As with all of the light-modulating devices discussed in this document, the use of such terms as 'color filters' is only used for the purposes of example: as I have stated many times before within this article, any space distribution or distribution of any light-modulating or light-frequency converting elements or materials may alternatively be employed, with the change of light-modulating properties caused, directly or indirectly, by electrowetting effect being caused to change the location, orientation, angle or other suchlike light-modulating effects of solid optical instruments on the surface of, or within, a liquid subject to electrowetting effect are included within the scope and claims of this patent application. Equally, the term optical instrument can include any kind of such instrument—e.g., it might be a prism, for example.

The Use of One or More Lenses Trapped at the Interface Between Two Fluids

One additional, optional approach would be to employ a solid lens or other optical instrument (e.g., one or more light-reflecting surfaces) trapped at the interface between two fluids which are mutually-immiscible, and at least one of which is subject to influence by electrowetting effect. Thus, by changing the shape, disposition or location of one or more such liquids in contact with another liquid by electrowetting effect, such an optical instrument trapped between two such liquids—for example, due to the respective different densities of the two liquids, the optical instrument may be changed in its attitude or performance due to it being forced to accord with said changes of shape or disposition of one or more of said liquids.

Solid Optical Lenses Located Inside, or on the Surface or, Fluid Droplets

As has already been discussed, one alternative to simply using droplets which are changed in shape or location by electrowetting or other electro-hydrodynamic forces is the use of a lens (or item able to function as a lens), or other optical instrument such as a reflector, prism, etc., composed of a solid material such as transparent plastic positioned either within, or on the surface of, a fluid droplet.

Taking as one possible example the case of a transparent plastic or glass sphere, it will be appreciated that, using a suitable fluid and (for example) a transparent sphere of appropriate refractive indexes and surface tensions, (1) the sphere could be retained inside the droplet by, among other factors, the surface tension on the droplet's outside surface; and (2) the sphere can, if so designed, perform an optically very predictable light-refracting function without significant optical distortion by the droplet within which it is located.

It will further be appreciated that, optionally, the lens-like solid particle, lens or other suitable optical item may be so shaped as to reduce any tendency for it to change its location or orientation within the droplet—which motion could, for example, otherwise have undermine its optical integrity and consistency.

Another possible function of the solid optical instrument (e.g., a suitably-shaped lens) located inside a droplet would be to assist in maintaining the desired curvature of the droplet—and thus helping to determine the refractive index of the droplet—by being so designed that the top surface of the lens lay close to, and roughly parallel with, the surface of the droplet.

Thus, the purpose here could be to achieve a higher degree of optical performance—in terms of predictably and accurately focussing or directing light onto a multi-colored light filter, for example—than could be achieved—or could be easily achieved—by only using a droplet to perform that light-refracting (or reflecting) function.

Figure 13:
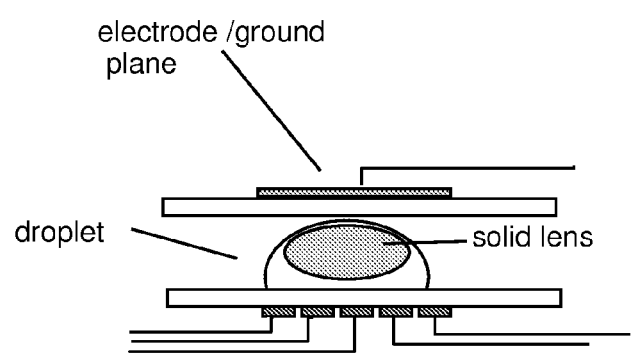
FIG. 13 shows an exemplary embodiment of one of many possible different electronic and lens-positioning and design configurations; this embodiment shows a configuration employing a 'lens in droplet' approach.

FIG. 13 shows such an example of one of many possible different electronic and lens-positioning/design configurations employing this 'lens in droplet' approach. Note that the term 'hydrophobic polymer substrates' is only provided as one example of materials and arrangements. Of course the material need not necessarily be polymer, for example, and not both inside surfaces necessarily need to be hydrophobic in respect of the liquid shown. Similarly, there are of course—as is shown in my existing patent and other prior art—many other possible electrowetting device arrangements and configurations that could be employed. As with all the diagrams in this patent application, the drawings are supplied simply to illustrate the principle being introduced—and in no way suggest that the particular configuration is the preferred route amongst so many possible ways of employing the same principle.

Clearly, aside from the many other possible electrical arrangements of such a system to achieve a 'droplet+lens' movement, other possible optical arrangements could position the lens in other positions in respect of the droplet—e.g., resting on the top surface of the lens. Clearly, in the particular design shown, the electrodes would probably be transparent—e.g., made of ITO.

Figure 14:
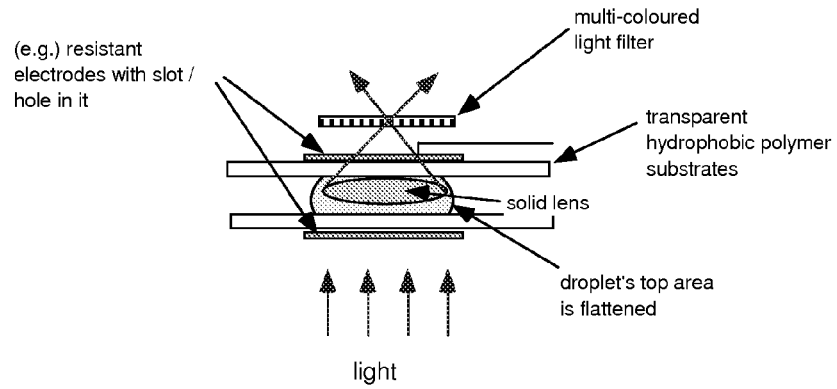
FIG. 14 shows an exemplary embodiment similar to that of FIG. 13, but in this embodiment the droplet, or measure of liquid, has a flat top (thus undermining its capabilities in functioning as a lens, for example), and the diffracting function may be performed solely by the solid lens within the droplet.

FIG. 14 shows a similar design to that of FIG. 13, but here the droplet, or measure of liquid, has a flat top (thus undermining its capabilities in functioning as a lens, for example), and the diffracting function may be performed solely by the solid lens within the droplet. (The elements of multi-colored filter, light source, etc. are included here merely to remind the reader of one of the many ways that the droplet can be used to direct light onto selected locations or zones of any space distribution of different light-modulating properties, or different light frequency-converting materials or items).

Of course, many other possible configurations employing different elements of the design shown could employ the same principles as those shown here, but achieve similar functionality with such different arrangements, or could achieve quite different functionality—e.g., the lower substrate could be light-reflective, and the light source could come from above the system in FIG. 13: e.g., it could be ambient light, with the lens focussing light onto a color filter, for example, located within the lower substrate, and thereby performing a similar 'color-selecting' function. Other lenses, not shown, are clearly possible.

[Incidentally, in most of the designs herein, and in the previous patent applications, such factors as collimating the light derived from a light source are not mentioned, although they are important for some of the designs—the reason being simply that the lens systems incorporated within these inventions do not constitute the inventive elements of these applications—and their design constraints and features are well-known to those skilled in the art. Methods of collimation are well-known to those skilled in the art.

In respect of all the diagrams in this patent application, it should be remembered that configurations and arrangements shown only represent demonstrations of a small number of the many possible different configurations and arrangements: for convenience, for example, light is generally shown as coming from the bottom of the diagram—though it could just as easily come from the top; equally, in most cases, systems depending upon reflected light—whether ambient or otherwise—can equally employ variations of arrangements shown herein where such is not the case.

With reference, then, to FIG. 14, the key point is that because the droplet within which the lens is located has a flattened top, it may therefore perform no refractive function—the refraction function thus being left to the lens within the droplet. Clearly, this 'flat-topped droplet' approach could also be used with many other approaches outlined herein and in the previous applications.

Similarly, the fact that a different electrode arrangement is shown in FIG. 14 is not specifically relevant to the point of the drawing and the associated design principles: it is merely used to remind the reader that many different electronics arrangements and configurations are possible to achieve the controlled displacement of the droplet to achieve the desired color change.

The reference in FIG. 14 to resistant electrodes with a hole in each is, similarly, just a reminder of different configurations possible in the designs, and is not intended to be specifically relevant to that particular droplet arrangement. The intention is simply to remind the reader that electrodes might be made of transparent or translucent conductive material, or they might be non-transparent materials—e.g., copper—with a slot, or hole in their design to allow light to pass through the areas it must pass through to allow the system to function. If a 'slot' is used, for example, the system design might be such that the droplet can only move along one axis—with a corresponding multi-color filter array (for example) arranged so that light focussed by the solid lens focuses onto different color(s) as the droplet is moved from one end of its range to the other end.

Figure 15:
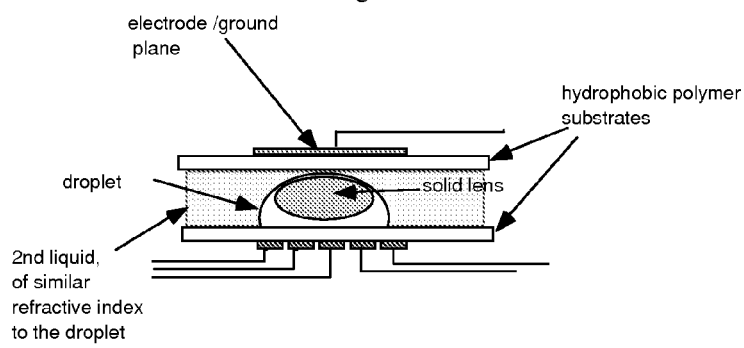
FIG. 15 shows another exemplary embodiment of a design approach whereby it is the solid lens, rather than the droplet or the droplet combined with the solid lens, which is responsible for the diffraction of light in the system.

FIG. 15 provides another example of a design approach whereby it is the solid lens, rather than the droplet, or the droplet combined with the solid lens, that is responsible for the diffraction of light in the system. In this drawing, a second liquid, immiscible with the droplet, surrounds the droplet. Provided that the refractive index of said second liquid is similar to that of the droplet fluid, then it will be appreciated that the solid lens within the droplet may be the only light-refracting element between the two substrates. Such an approach might, for example, be used where the liquid droplet is composed of a polar liquid, and the surrounding liquid is a non-polar liquid. In this as in all other designs and ideas provided within this document, where more than one measures of liquid are in contact with each other, typically they will be mutually-immiscible.

It is noteworthy that one of a number of important potential advantages of locating a solid lens within the droplet includes the diminishing or removal of potential problems associated with ensuring a proper 'lens-like' curvature of the top surface of a droplet not incorporating a solid lens, if the system design were to permit the droplet to be flattened at the top surface by contact with the upper polymer substrate: clearly, if a solid lens is located within the droplet, for example, its optical performance as a lens would not be undermined by such a situation.

Although the lens shown has a shape which enhances its shape-conformity with the top surface of the droplet shown, any shape of lens-performing item may be employed, with accordingly different performance results, and concomitant potential advantages and disadvantages. Similarly, once again, it should be remembered that in all these drawings and descriptions, where a solid lens is used in a drawing or a description, it could just as well have been a light-reflecting or other light-refracting element, or any other light-modulating or light frequency converting instrument or material that was employed instead of such a lens.

Also noteworthy is that although one attractive way of employing this 'solid lens in/on droplet' approach is for the purposes of controllably moving the droplet sideways, and thereby directing light onto different colors within a multi-colored filter array, it would also be possible to employ the same approach where a droplet is being made 'flatter' or more bulbous by electrowetting means affecting the angle between the droplet and the surface it is touching, or increasing the field strength acting on the droplet—and a solid lens is located within, or on the surface of, a droplet being thus made flatter or more bulbous.

Clearly, one potential use of this approach would be as a focussing, or 'zoom lens' tool (depending on the configuration of other lenses), where the solid lens is simply being raised or lowered by the change in the profile of the droplet. Another potential use would be to provide a variable focal length lens by providing one or more additional solid lens at appropriate other positions in respect of the 'lens in droplet'.

Figure 16:
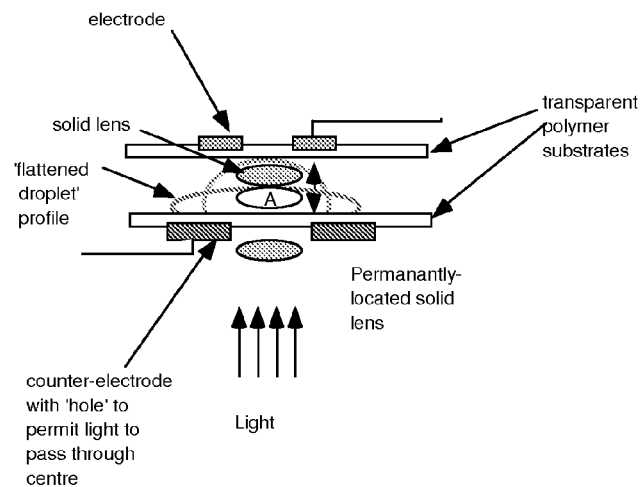
FIG. 16 shows a simplified illustration of an exemplary embodiment and approach, where the distance between the two solid lenses shown varies according to the controllable variation of the voltage I polarity of the electric charge delivered to two different electrodes, as the droplet causes the solid 'lens in droplet' to rise and fall.

FIG. 16 gives a simplified illustration of this type of approach, where the distance between the two solid lenses shown varies according to the controllable variation of the voltage/polarity of the electric charge delivered to (in this particular layout) two different electrodes, as the droplet causes the solid 'lens in droplet' to rise and fall.

It will be appreciated that in the above diagram, simplified for the purposes of showing the principle of this approach, light (advantageously, collimated) passes through a first lens (or lens system) which is permanently located in that position; it then passes through the lens located within the droplet and then onwards towards, for example, a display screen—or one or more further lenses to expand the light paths to fill the pixel size at the screen front. Clearly, additional lenses may be located above, as well as below, the droplet, depending upon the objectives of the particular system. Equally, although a transparent substrate is shown acting as a 'window' above the droplet, in certain design approaches that 'window' could simply be a hole in the substrate.

In this drawing, the green-outlined droplet represents the droplet in a bulbous profile configuration (i.e., the surface upon which it is located is hydrophobic in respect of the liquid), and the red-outlined droplet represents one possible profile when, for example, electrowetting/effect exerts a 'flattening' effect on the droplet profile. The choice of liquid for the droplet would, obviously, be determined by the particular droplet shape-manipulation method being used, as well the need for an appropriate diffraction index to suit the particular optical arrangement, and to avoid optically disrupting the function of the 'lens in droplet' unless so desired. (Thus, for example, the droplet might, as previously discussed, actually be located within a 2nd liquid of similar refractive index). For the sake of an example, the droplet being manipulated could be a polar, or conductive, droplet—and the 2nd liquid could be a mutually-immiscible non-polar liquid.

The point marked 'A' is one possible position of the solid lens when the droplet is 'flattened' (i.e., spread over a larger area), as shown by the red-outlined droplet. The solid lens has, thus, dropped down in the drawing, thereby shortening the distance between itself and the permanently-positioned lens shown below the lower substrate.

Another, optional, approach would be to 'tilt' the angle of solid lens in the droplet by causing the droplet to 'bulge up' at one side more than at the other—e.g., to bias the system. Examples of methods of achieving this effect have been discussed in existing patent application, and in other prior art. A similar purpose could be achieved with a 'lens in droplet' approach—but with the additional potential advantage of perhaps better optical performance from the 'lens in droplet' than could be achieved with only the droplet.

It should be noted that while only one 'level' of system is shown in the above drawing, it will be appreciated that—as is the case with many of the electrowetting systems described in this document) multiple duplications of the 'lens in droplet' approach could be used, so that more than one solid lens is controllably movable—either vertically (e.g., so as to increase or decrease the distance between the solid lenses within droplets), or laterally (which could, for example, achieve a greater diffraction of light paths by a smaller distance movement of one or more lenses within droplets).

Figure 17:
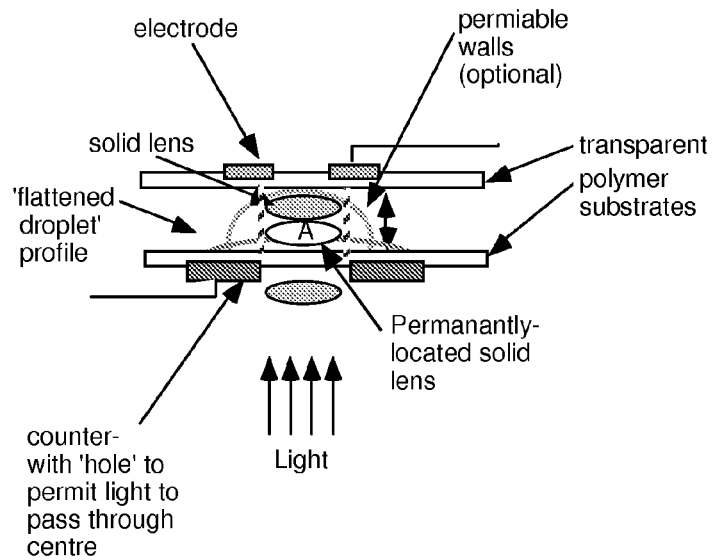
FIG. 17 shows an exemplary embodiment and approach similar to the one shown in FIG. 16, except that this embodiment comprises permeable walls restricting the lenses within droplets (or indeed droplets themselves) in their scope of physical movement.

Similarly, though no physical 'walls' are shown in the above or other drawings which would restrict lenses within droplets (or indeed droplets themselves) in their scope of physical movement, these are clearly feasible, and in certain applications/configurations, could be used advantageously. These walls, or barriers, need not in all applications be solid, but may instead restrict, for example, a solid lens within a droplet from moving laterally, whilst allowing the fluid within which it is located to flow freely, so as, for example, to restrict the solid optical instrument so that it remains properly positioned to perform its optical task in relation to other lenses or optical instruments, including color filter arrays. Such 'permeable walls' are shown in FIG. 17.

In examples like this, other suitable means may be added to enhance the stability of the optical instrument—in this case, the solid lens—so that it does not become destabilised by making contact with the walls surrounding it. One means of achieving this is to ensure that the surface tension differential between the inner surface of the 'walls' within which the lens is located, and the liquid itself, is suitably calibrated so that the solid optical instrument will be constrained by said surface tension differential from touching the sides of the 'tube' within which it is located.

Optionally, magnetic fields produced by fixed-position, permanent magnets could be used to help retain optical elements, which would be magnetised, in their desired location.

It should also be pointed out that while with some applications of the 'lens in/on droplet' approach, the objective would be to make, insofar as is feasible, the fluid droplet to be 'optically invisible' in terms of its diffractive index allowing the solid lens to be the only light-diffracting element in the droplet, other approaches could potentially take the opposite approach, and employ the diffractive qualities of both the 'lens in droplet' and the droplet itself.

This patent application includes within its scope the use of other light path-changing optical instruments—such as prisms, reflectors, etc. —where their affect on the passage and routes of light passing through the system is controllably altered by changing the shape, position or orientation of the droplet. Thus, as a simple example, a hinged diffractive or reflective element which 'floated' on the top of droplet, and was secured at one side to a permanently-located design element so that it changed its angle (for example) to the horizontal, or its orientation, as the droplet moved or changed its profile or shape, would fall within the scope of this application.

Similarly, multiple solid lenses—e.g., a solid lens array—which 'floated' within or on the surface of one or more droplets whose position, shape, profile or area was controllably varied by methods discussed in this or my previous application, would also fall within the terms of this patent application.

Figure 18:
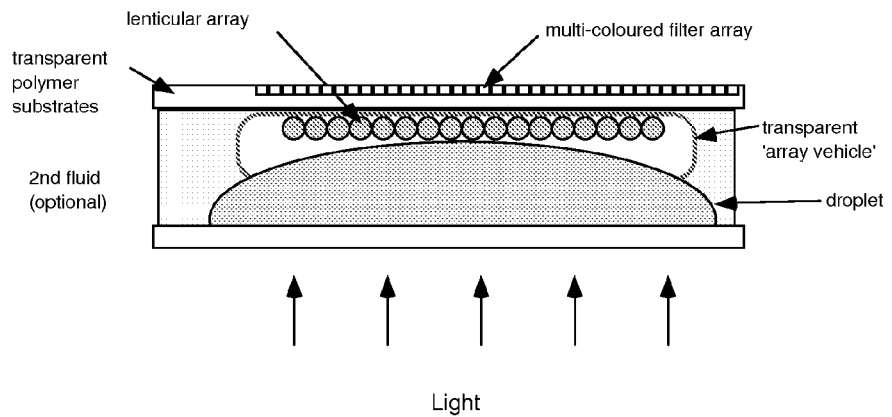
FIG. 18, shows an exemplary embodiment of one of many possible arrangements whereby the 'sideways' movement of a droplet can be used as an actuator means to move a lenticular or other lens array, or light-diffracting or light-reflecting array or color filter array, sideways and thereby change the color or image emerging from the system.

FIG. 18 shows a simplified illustration of one means of executing such an approach.

In FIG. 18, we see one of many possible arrangements whereby the 'sideways' movement of a droplet can be used as an actuator means to move a lenticular or other lens array, or light-diffracting or light-reflecting array or color filter array, sideways—and thereby change the color or image emerging from the system. Such a system could of course be used in 2-axis, so that a 'floating' microlens array could be controllably moved both North-South, and East-West (figuratively speaking) in respect of other, fixed-position lenses or lens or reflector arrays.

As with all the other diagrams herein, the above drawing is only meant to focus on the particular idea in question—and thereby in this case, for example, one or more possible arrangements of the electrodes, etc. are not shown, as these are discussed elsewhere in this and my previous applications, and in many cases are well-known to those skilled in the art.

It will be understood that in respect of the above drawing, the use of the electrowetting means of moving droplets already discussed, as well as other droplet-moving means already known to those skilled in the art, provides a useful means of moving the lenticular array from side to side (for example) so that the array may focus light onto differently-colored light filters on the filter array shown above the lens array.

By this means, of course, different colors or images may be controllably caused to emerge from the system. If the above light filter array were, for example, in fact a series of pictures compressed in the normal manner used in 'lenticular photographs', then it will be appreciated that a series of different 'frames' showing different images contained within the 'composite photograph' would be shown.

It will be appreciated that many other droplet-moving arrangements are possible to achieve a similar result, using the same principles—such as, for example, using more than one droplet to influence the position of the lens array, so that, for example, the lens or reflective array 'rides' on a number of droplets. Similarly, it will be understood that the positions of the lens and filter array could easily be reversed, so that the position or 'posture' of the droplet(s) are instead moving the light filter or composite photograph or image, and the lens array be fixed in position. And so on.

Clearly, a similar approach can be taken to moving one lens array in respect of another. Such lens arrays may, optionally, be microlens arrays.

The reason why this approach is particularly interesting is that it potential presents an actuation means for varying the configuration of optical elements within a display without having to use existing actuators such as piezoceramics, etc., which often are either too expensive, or require high voltage, or suffer from other disadvantages such as very small 'stroke'.

Apart from the well-known (to those skilled in the art, as revealed in existing prior art) means of 'flattening' or making more 'bulbous' the profile of a droplet or measure of liquid, another interesting technique is to manipulate a droplet's total area is to move it laterally—employing techniques already discussed in this and my former patent applications—onto areas of pre-treated surface(s) with different wetting patterns that the droplet is in contact with, so that the droplet will change its profile (=total area) due to the different surface wetting patterns of the polymer surfaces to which it is displaced.

FIG. 18 shows one of many possible arrangements employing this principle. The top half of the illustration shows a view of a substrate bearing a droplet from above; the lower half shows the same substrate from the viewpoint of the human eye at right (shown). Although a resistant electrode is the preferred means of controlling such a device, alternatively a plurality of separately-addressable electrodes could be employed to achieve similar functionality.

The turquoise area represents an area of greater wettability, or wetting. That area is surrounded by an area of less wettability—e.g., it might be ultrahydrophobic. A gradient of hydrophobicity may optionally be employed to induce the droplet to move from one end to the other of the area within the ultra-hydrophobic boundaries.

In the drawing, we can see that, from right to left, the width of the area within the droplet can move decreases: this forces the droplet to become more 'bulbous' as it moves from right to left due to electrowetting effect—thus changing its optical performance, or focal length.

Optionally, if the above system were to be used in a display system, one or more optical lenses could be used in the above example to compensate for the lateral movement of the drop in respect of its position within the total 'cell' area in a display—so that, for example, light rays passing through such a droplet are progressively 'diffracted towards the centre of the 'pixel' at the screen itself, as the droplet is moved progressive further from the centre of said pixel, or 'cell'.

Clearly, this is only a simplified illustration to demonstrate a point: namely, that suitable patterning of wetting and non-wetting on the substrate surface, together with suitably-positioned and configured electrodes, can be used as a means of controllably changing the cross-sectional profile, or to change the area of solid-liquid interface—and thus change the optical performance of the droplet.

Such an approach can be used in an almost infinite number of different ways to change one or more droplet's optical performance as it/they are moved along the surface of a substrate.

Thus, for example, this technique could be used to change the focal length of a droplet functioning as a lens, or to change the reflective performance of the droplet's surface if it were serving to reflect light, and so on. Clearly, if this system were duplicated 'one on top of the other' so that (say) two substrates bearing droplets were above each other, and were moved so that, for example, they stay above each other in the path of light, then they might change their shapes in similar or different ways as they moved (say) to the left—thereby changing their combined optical effects on light passing through or onto them.

Clearly, optionally, one or more droplets could bear solid lenses or other optical instruments within or on their surfaces.

It should be pointed out that this type of technique can be used to cause droplets to move to positions which are not within the strongest field (or most wettable areas) close to them—but are 'as close as they can get' in view of the wetting patterns to which they are subject.

Florescent 'Doping' of Droplets

It should be pointed out that in any appropriate droplet-employing display or color filter means such as those disclosed herein or in my previous patent applications, the droplets can optionally be 'doped' with fluorescent material which convert UV, for example, into visible light of different colors (depending upon the frequency-converting, or 'down-converting' materials employed. In this way, whether using UV-emitting light source(s) or ambient light, a high brightness can be emitted by the droplets. Such systems can also employ reflective surfaces to reflect ambient light, and can also employ systems exploiting internal reflections within a transparent solid material such as plastic together with the droplets.

The Use of Droplet-Using Display Means as a Dynamic Color Filter Control Means

As has been pointed out in my earlier patent applications, the various droplet-manipulating systems discussed can be used for applications beside electronic displays. For instance, the same or similar techniques can be used to provide a dynamically-controllable color filter means, instead of displaying visual information in the conventional sense.

Examples of such applications include placing a droplet-using array in front of one or more light source(s) so as to change the color of the emerging light for such purposes as concert or theatre lighting, underwater swimming pool lighting, shop lighting, etc.

Equally, many if not all of the systems and design principles described herein can be used for the purposes of optical signalling—e.g., for fibber optics communications—or any other light-modulating purposes.

Color-Changing Walls, Screens, Etc.

One possible application of the droplet displays/filter described is to block light, or uniformly change its color, across an array or surface. Thus, a glass screen around a shower could employ the droplet approach to cause the glass screen to change from transparent or translucent to (e.g.) black or another color when someone is showering, for their privacy.

The same methods can be used wherever it is desired to uniformly (or non-uniformly) change the color, or render non-transparent, an entire surface—be it an (e.g.) transparent/translucent screen or wall, or the surface of a product, etc. Thus, for example, the surface of a mobile phone case could be changed to a desired color, or pattern, if any appropriate one of the droplet systems already disclosed is located at or beneath the surface of the case of a product (assuming a transparent case where the droplet system is located beneath the outer surface).

It should be pointed out it is possible to 'pump' droplets progressively across a transparent or translucent medium—preferably where there are at least two layers of the material, so that the droplets can be moved in the gap between the layers. Techniques for moving droplets of liquids can include any combination of those described in this, or my previous applications, but with the change that instead of merely moving the droplet back and forth (as in the case of the 'moving liquid lens' type of approaches), in this case we would be 'passing' the droplet from one pair of electrodes to another, so as to progressively move the droplet to its target 'destination'. Such droplets, for example, could be of different colors, or possess other different light-modulating properties.

Optionally, any of my invented droplet-moving systems can incorporate 'feedback' systems to enable the controlling microprocessor to monitor the current position of droplets, and to apply appropriate voltages to appropriately-located electrodes so as to move the droplet by electrowetting means to a new position from that current position. One of many possible technology means of achieving such feedback on droplet location across an arrays would be capacitive sensing used between two or more electrodes within the system: different readings would indicate the presence, or absence, of a droplet, and, indeed, could be used to derive such information as the color of, for example, a certain pixel by determining the droplet's current position.

By this means, a 'glass wall' or glass screen, for example, can be caused to either change color, or to change from opaque to non-opaque, for example, by moving droplets in an interstice between layers within the transparent or translucent item in question.

Droplet-Based 'Camera' ('Ejected Image-Bearing Substrate') System

It is possible, using many of the droplet-using display systems and approaches discussed herein or in the previous applications, or combinations thereof, to make a system which will take a digital photograph' using any suitable optical sensor array system—e.g. CCD, CMOS array, etc—and then use that data to adjust a multi-pixel droplet display mounted on a suitable substrate(s) composed of one or more layers, so that the display on said substrate represents, within the limits of the droplet system used, represents the image recorded by the optical sensor array—and then to 'lock' that display (if necessary, in the case of 'volatile' droplet systems) so that it becomes non-volatile, and then to eject the image-bearing substrate(s)/film from the camera. The ejected substrate thus would function similarly to a photograph, or printed sheet of plastic or paper, etc., in displaying a representation of the recorded image.

Figure 20:
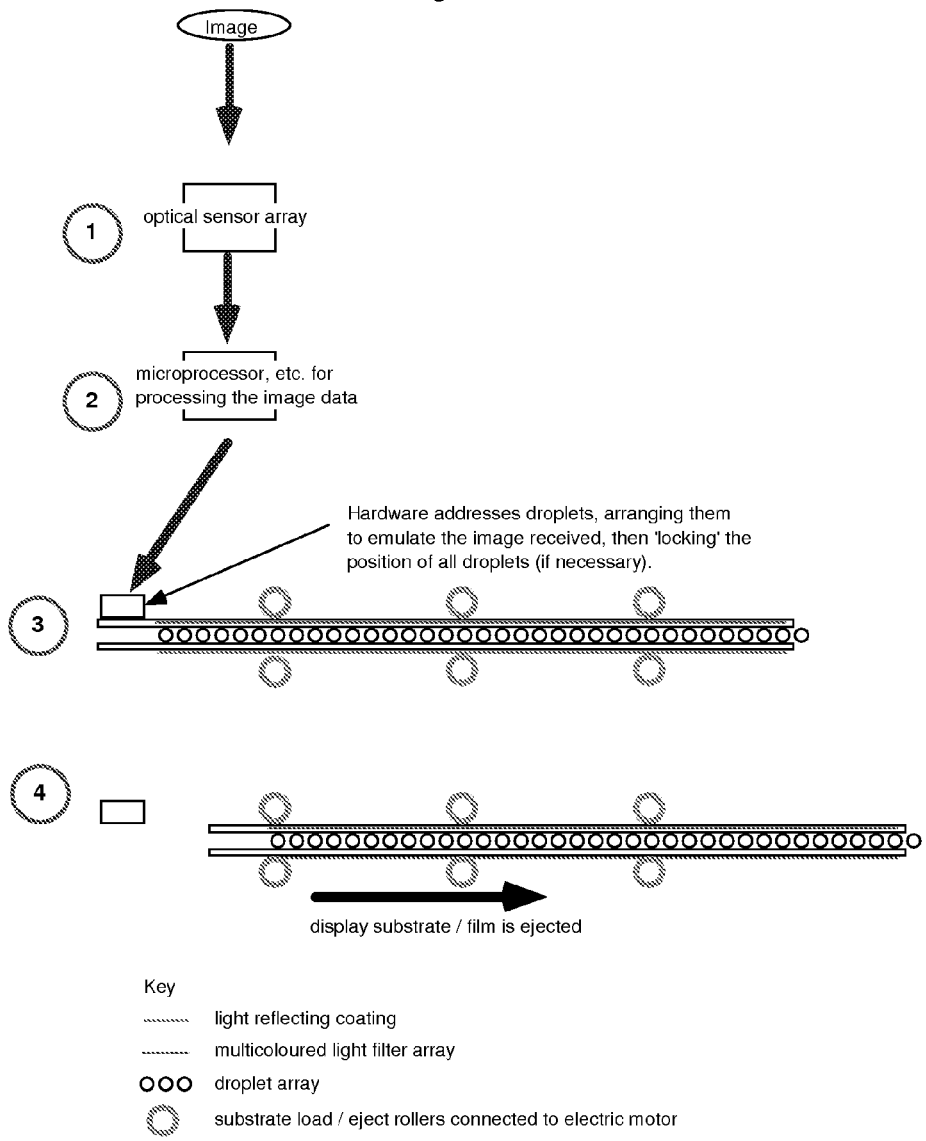
FIG. 20 shows an exemplary embodiment of a system that, by using many of the droplet-using display systems and approaches discussed herein or in the previous applications, or combinations thereof, can take a digital photograph and then use that data to adjust a multi-pixel droplet display.

FIG. 20 shows, in schematic terms, one means of achieving this.

Equally, it is possible to so arrange said substrate and its component elements and electrical connections to the camera system so that that the 'photograph' (as described above) can be re-used to display another, different image, and then to be again ejected or removed from the camera. To achieve this, the 'photograph' could be inserted into a suitably-designed device similar to the device described above, which would re-connect the image-bearing substrate(s) to the addressing hardware, to then 'unlock' the droplet-positioning system if necessary by any suitable means, and then to repeat the process described above.

The only essential difference between this approach and other described above it is that instead of the display means being a screen system permanently connected to a microprocessor and other hardware, with the approach outlined above, the display means, incorporating one or more (probably multi-layered) substrate(s) or film, and employing whatever arrangement of droplets, second liquid (optional), electrodes, address lines, etc. that is applicable to the particular droplet display system chosen, can be detachable from the image-collecting and (optionally) the processing and/or addressing hardware. Clearly, if microprocessors, CMOS optical arrays and the like in the future become sufficiently low-cost, the ejected image-bearing substrate might incorporate one or more of such elements permanently on-board the image-bearing substrate—so that, for example, a 'flat camera' with incorporated image display would be feasible.

Clearly, a similar approach can be taken without the use of an optical image array, where instead an image, or other text (etc.) data is transmitted by any suitable means (e.g., direct electrical connection, R/F, optically, etc.) to hardware connected to a droplet-based display system, which then uses the received data to configure the display at each pixel, or cell, of the display, and then the image-bearing substrate is released from the suitable elements of the microprocessor/hardware equipment, so that the image-bearing substrate is as low-cost as is feasible—thus potentially providing a 'printing' system, for example, where the 'printed material' could be re-used to carry different text/images.

It should also be noted that with the ever-decreasing cost of optical arrays, microprocessors, etc., a device may be feasible quite soon which employs an image-gathering means such as a CMOS array, a microprocessor, memory facility, conductive address lines, multi-layer substrates, droplets, power source etc. on a single flat device—so that, for example, a device approximately the size of a credit card could incorporate all of the above, and display an image of whatever the optical image-gathering array is pointed at.

PCB-Mounted Droplet-Employing Display Systems

Clearly, droplet-employing flat-screen color display systems such as are discussed herein and in my previous applications have the potential for being applied to many unique new product missions—perhaps particularly because many of said display systems can be light-reflective (i.e., employ ambient light to be read, and thus require little electric power.

As just one or so many possible examples to illustrate this point, such display systems could be mounted directly onto PCBs and the like, thereby potentially achieving substantial economies for manufacturers of electronic devices benefiting from a low-cost, on-board display means.

Uniform Color Across a Droplet-Employing Display System

Clearly, there are many product or technology missions where only a color change is required across an area (i.e., a representation of text or images is not needed), and thus individual addressing of each pixel, or 'cell' is similarly not required. If, for example, the function of the droplet-employing 'screen display' is merely to change the color of a product's outer case (or portion of it), then substantial economies can be obtained by arranging the addressing system so that all pixels, or cells, are addressed in common—as if, in effect, they were all one pixel. Using such an approach (often together with a reflective layer beneath the droplets) the color of many every day objects such as phones, computer monitor cases, cars, credit cards, wall paper, dynamic light filters for lamps, etc., etc.

Equally, it may be that the requirements of the display system fall somewhere between an individually-addressable 'matrix pattern' pixel system on the one hand, and a uniform color on the other. Perhaps—as a somewhat poor example which nevertheless illustrates the point—color-changing wallpaper bearing multiple images of fleur de lys may require that the fleur de lys will all be the same color (but that their color is adjustable), and that the 'background' color 'behind' them is also addressed as a single entity. This example is only supplied to illustrate the point that in some cases, there is no point in providing an addressing system able to address a vast number of individual pixels of equal size, equally distributed in matrix array, when actually only a far smaller number of 'pixels' (all the fleur de lys may be addressed as one) are required. Thus, each fleur de Lys may optionally incorporate a large number of droplets which are addressed as one.

Similarly, traffic signs with multiple possible messages to be displayed could have the different text and/or graphic patterns arranged as 'icons' with single address systems (rather than addressing multiple pixels within each message). (Like the examples above, this could employ any of my proposed droplet-using display approaches).

As a simple example, a traffic sign with the graphic messages 'No entry' and 'One Way Street' for display at different times of the day, if the particular droplet approach was transparent droplets (possibly fluorescent-doped) with a light-reflective surface, then one approach would simply be to arrange the droplets as though they were a lenticular array—thus by moving them, they would cause light to be directed onto one of the two possible images. If, however, that approach were not desired, then electrodes could be positioned so as to create both display—and either one set of electrodes would be charged, or the other one would.

It should be pointed out that 'uniform color droplet arrays' can also advantageously be used to control the color of the backlighting for other display technologies—e.g., LCD—allowing the user of a device to themselves determine what backlighting color they want within a vast array of possible colors.

The Use of any Electrowetting Effect-Driven Light-Modulating Droplet System with Stationary Cameras or Other Optical Sensors If the location or shape of a measure of liquid subject to electrowetting effect is manipulated by electrowetting effect so that said change of shape or location serves to change properties of light passing into a camera—whether conventional or digital—then clearly this can be used as a means of achieving some of the functionality of having a movable camera (or other optical sensor) where the camera itself remains stationary. Many of the droplet-manipulation systems described herein, or in my existing US patent (or indeed any other electrowetting droplet manipulation system) may be employed, together with a camera or other optical sensing device, to achieve this purpose.

I claim as my invention any electronically-controlled display system employing measures of liquid which are changed in shape or location by electrowetting effect to controllably direct, or control the amplitude or other properties of light which pass onto or through any space distribution of different light-modulating or different light frequency converting elements, items or materials for the purposes of controllably modulating properties of light emerging from such a system.

Multiple Droplets within Single 'Pixels' or 'Cells', and Cell Wall Design

There are many circumstances where it may be advantageous to provide a number of droplets within a 'cell' or pixel, instead of providing only one droplet within one separately-addressable cell or pixel.

One of many possible reasons why multiple droplets within cells can be advantageous is related to gravity: generally speaking, and depending upon the particular design of the system in question, as droplets get bigger, then become less subject to electrostatic forces, and more subject to gravitational sources.

Thus, it may in many circumstances be attractive to provide a number of small (e.g., 10-50 microns diameter) droplets within a single 'cell', which will therefore (apart from other considerations) be less subject to being accidentally displaced from their correct position, or indeed to being displaced from their own cell altogether, by a large physical shock being applied to the screen system (when it's dropped, for example), if 'walls' between cells are not used.

Thus, a single display cell might look like any of the droplet display systems shown herein and in my previous applications—but duplicated several times, with common address lines leading to electrodes (generally speaking) insulated from, but close to, each individual droplet.

Figure 21:
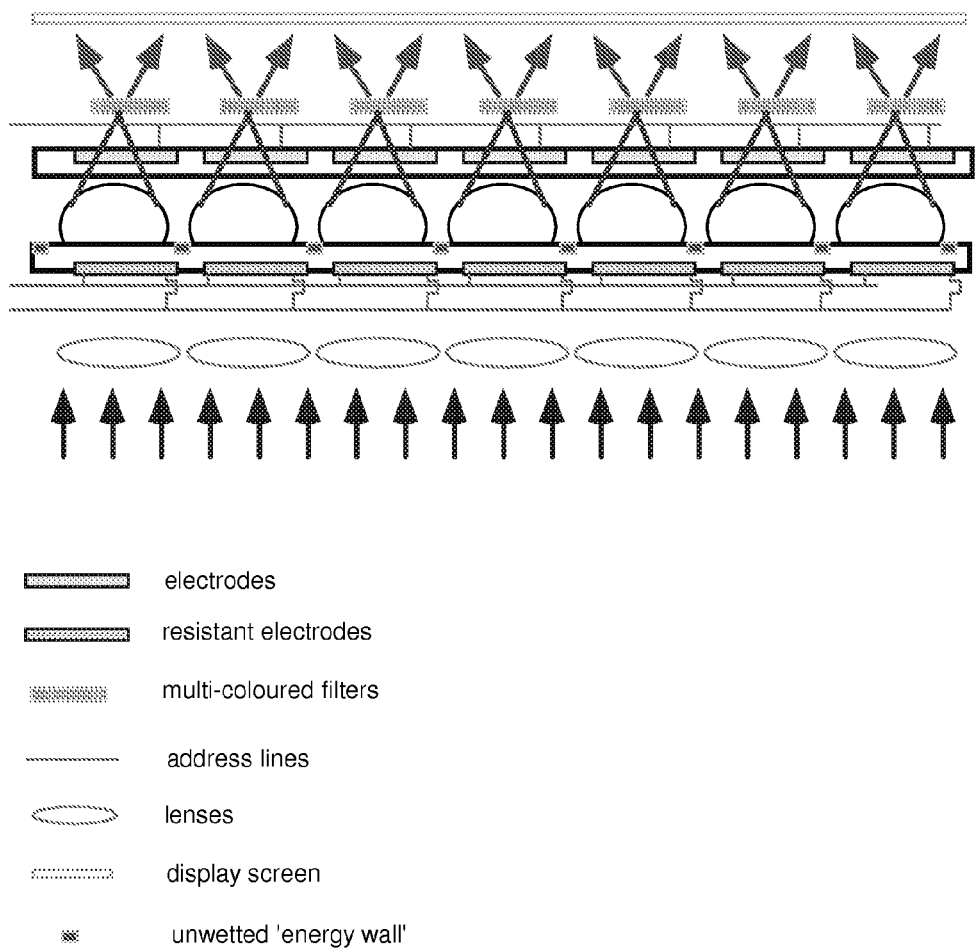
FIG. 21 shows an exemplary embodiment of a single 'cell' of one possible arrangement for a droplet display system.

FIG. 21 shows one single 'cell' of one possible arrangement for a droplet display system. In this particular arrangement, which is simplified and not to scale, and is chosen merely for the purposes of example, we see a backlit layout, employing resistant electrodes with different voltages applied to each electrode end beneath the lower substrate, and simple electrodes shown above the upper substrate. The address lines are shown to illustrate the point that the upper and lower electrode 'sets' are addressed in common—i.e., there are in effect only 3 separate address lines here.

I have also added in markers indicating ultrahydrophobic areas to delimit the scope of movement (in droplet-displacing approaches) of the droplets, and to keep them separate. Obviously, the drawing is not to scale—as otherwise the droplets could hardly move!

Wetting Patterns Used to Retain Droplets in a Desired Position.

With many of the droplet systems discussed herein, and in my previous applications, it is advantageous that the droplet (s), having been moved to a target location, should stay in that location until a different performance (e.g., color variation) is required of them—at which time they will again be moved. A non-volatile display system, where the droplets do not require an electric charge to hold them in a certain position, is clearly advantageous.

Provided that droplets are sufficiently small, electrostatic forces will in many circumstances be quite adequate for retaining droplets in their 'targeted' locations. However, one means of assisting in maintaining the position of a droplet that is in contact with one or more substrates or surfaces is to provide a pattern of different wetting properties on the surfaces with which droplets may come into contact so that a certain amount of energy—which preferably is unlikely to be exerted other than by the application of electrical energy to appropriate electrodes proximate to the droplets—is required to be applied to the droplet in order to move it from any position.

There are many possible patterning approaches for the distribution of differentially wetted surfaces to achieve such a 'movement inhibiting' function. The main point is that by presenting the droplet with a series of 'energy barriers' provided by surfaces that are unwetted relative to other adjacent surfaces, the droplet must have sufficient energy applied to it to overcome the resistance that that energy barrier presents.

Thus, in a simple example where the droplet's scope of movement is only along a straight line from position A to position B, if there are a series of suitably-configured and suitably-sized and shaped such energy barriers presented to it along that line, these will act to inhibit the movement of the droplet from its assigned location.

If, on the other hand, the droplet is permitted to move in more than one axis, then a pattern of lines, or gradients, of wetted and relatively unwetted surfaces can serve to similarly inhibit droplet movement. Whilst in many cases these could take the shape of straight or curved zones across the substrate surface, there are many alternative patterning approaches—including, for example, 'dots' with hydrophilic properties so that the droplet will tend to 'centre' itself over such small filled circles unless appropriate electrical power is applied to adjacent electrodes.

Clearly, the ideal level of such 'energy barriers' is that they are the minimum necessary to prevent accidental (i.e., droplet movement not dictated by the electronic droplet control system) movement, while requiring only the minimum energy necessary to induce the droplets to 'climb over' such barriers—e.g., the voltage applied to proximate electrodes is sufficient to overcome the 'resistance' of the 'energy barriers'—when such a movement is required of the display system.

I claim, in addition to the above, the use of relatively high hydrophobic levels in certain areas to act as 'borders'—i.e., to act as energy barriers to delimit the scope of movement of one or more droplets to the area—e.g., a cell, or pixel—within which they are designed to be able to move.

Meniscus/Liquid Surface Profile-Distortion Dynamic Color Filtering/Screen Display Approaches Whereas many of the optical display and dynamic color filtering approaches discussed herein and in my published US patent on electrowetting displays, applications have related to liquid droplets being moved or shape-manipulated in what could be termed 'open' environments—i.e., where the droplets are not constrained on all sides—similar approaches can be used with liquids located within tubes and other containers.

As is well known, the shape of the top and bottom surface meniscuses of a droplet in a tube can be made to be convex or concave by providing a suitable surface tension differential between the inside surfaces of the tube and the surface tension of the droplet liquid itself. For this reason, it is possible for a droplet to function as an optical lens—the optical refractive index of which can be controlled by modulation of the aforesaid absolute and comparative surface tension levels.

Similarly, using the techniques shown herein and in my existing US patent, it has been shown that droplets can be induced to move by various different approaches employing, generally, electro hydrodynamic forces—in particular, electrowetting effect—induced by various different arrangements of electrodes and different types of liquids (e.g., polar and non-polar liquids).

Figure 22:
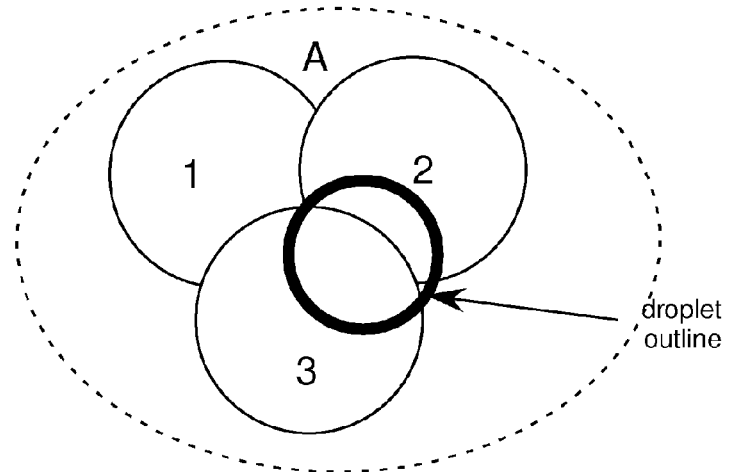
FIG. 22 shows an exemplary embodiment of a system where a liquid droplet is placed inside a tube and where the tube incorporates on its inner surface a hydrophobic material.
Figure 22:
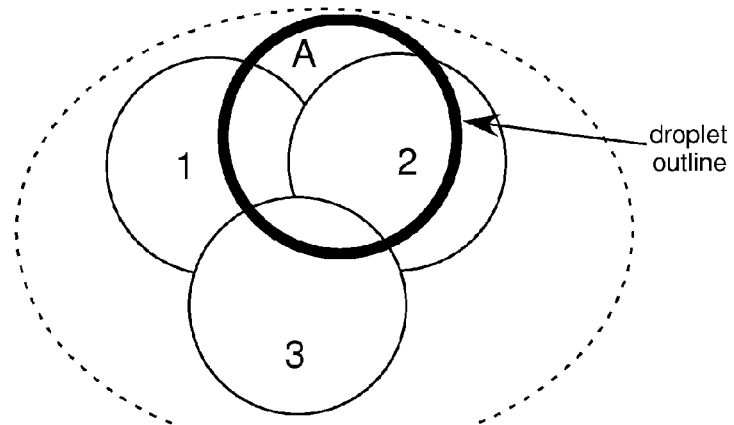

FIG. 22 shows a simple example of one such possible arrangement, where a tube is used instead of, for example, a couple of hydrophobic substrates with a droplet in between them.

Here we see a droplet of appropriate dielectric properties located within a tube, which we may assume here incorporates on its inner surface a hydrophobic material, and is in most (but not all) possible approaches there will be an electrical insulating layer between the electrodes and the liquid—with the hydrophobic layer closest to the liquid.

In this particular example, the inner walls of the tube are pre-treated—as explained in other examples herein—so as to make (in this particular example) the wetting properties lowest towards the top, with progressively increasing wettability further down the tube. However, this is only one strictly optional approach.

Outside the tube is located, (in this example), two electrodes, each occupying, as it were, one hemisphere of the 'sleeve' around the tube, insulated from each other. One electrode is a resistant electrode; occupying the other half of the 'sleeve' is a counter-electrode. (Obviously, there are many other possible arrangements, including laterally-oriented and separately-addressable 'rings' of electrodes [which may optionally be resistant electrodes], either separately addressable, or addressable as 'sets' of electrodes which are separately addressable, which can then be used to controllably induce the droplets to move up and down the tube, or to change their shape).

In this example employing a resistant electrode where we are modulating the difference of potential between one electrode and the other at different points along the length of the resistant electrode by modulating the voltage applied to different points on the resistant electrode (and thereby modulating the location and value of one or more electric field being applied between the electrodes—thereby modulating the hydrophobic properties of a surface with which the droplet is in contact).

The voltage applied to address line A may be, for example, 15 V, and the potential delivered to the other electrode may be zero volts (purely for the sake of example to illustrate the principle here).

In the absence of suitable electrical potential being applied to the electrodes, the droplet might lie at the bottom of the tube due to gravity; with sufficient and suitable electrical charges applied at points A and B, and C, the resulting electro hydrodynamic forces can induce the droplet to controllably move up and down the tube. Optionally of course, there may be two or more liquids present—for example the droplet shown may be of a polar liquid, and there may be a second, non-polar liquid with which it is mutually-immiscible present as well. In some cases it may be advantageous to use liquids of similar density or specific gravity, so as to offset some effects of gravity, if so desired.

At the bottom of the drawing is shown a fixed-location lens. Beneath this lens might, for example, be a light source, or a light-reflective layer, depending on whether this system is used for backlit, or reflective display, purposes (if it is, of course, a display system at all; it could be any kind of light-modulating device).

It will be appreciated that by controllably moving the droplet up and down the tube, a focussing function, or variable focal length optical system, can be achieved. Clearly, an array of such devices as are shown in this diagram could be arranged in an array alongside each other, for example, to provide multi-cell similar or different optical performance. Whilst the principles above can be used at many different scales, such an array might prove particularly attractive on a very small scale—say, for example, where the droplet size might be 20-200 microns in diameter, and the system is contained within two or more substrates, at least one of them being transparent.

Also notable is the observation that by electrically changing the electrowetting/electro hydrodynamic forces acting on the droplet, both the curvature of the top and bottom faces can be changed, as well as the distance between the top and bottom—with the consequent changes in optical performance of the droplet.

As a further development of this approach, it will be appreciated that it would be possible to have more than one mobile droplet in such a 'tube' as is shown above (e.g., one able to operate in the upper half, and another limited to the bottom half)—thereby providing, for example, the potential for a flat array of 'zoom lens' capability in each 'cell'. In such a scenario, there may optionally be provided more than one resistant electrode—for example, one to control each of two droplets.

Optionally, a solid optical instrument such as a lens, reflector, etc. could be located within one or more droplet of such systems, if desired.

Solid Multicolored Filter within a Droplet

It should be pointed out that apart from the other optical instruments—lens, reflector, etc.—that may be located within or on the surface of a droplet, a multi-colored light filter could alternatively be used. In addition to the other control means already discussed, its orientation or location—and this applies also to any of the other alternative optical instruments—could as an alternative to the methods described elsewhere herein optionally be controlled or influenced by an electric field, or electromagnetic or magnetic field, applied for example by the use of one or more resistant electrodes located adjacent to, but preferably insulated from, the droplet.

'Window' Droplet in Combination with a 2nd, Mutually-Immiscible Droplet of Different Light-Modulating or Light-Transmitting Properties It is simply impossible to list all the different—or even the primary—possible ways and arrangements to exploit the droplet moving/manipulating techniques I have described in this and previous patent applications. However, I will outline the following 'different' approach simply to show that what may seem to be 'different' from the arrangements I have discussed hitherto is really still simply yet another alternative way of applying the same principles as I have already described.

[Note: I have labelled the following diagrams used to illustrate this principle with (a), (b) and (c) suffixes to the previous diagram's number, simply to continue the sequence of figure numbers. There is no other significance to this labelling of these figures, and it does not imply any particular relationship with the previous drawing—FIG. 22].

FIGS. 22(*a*), 22(*b*) and 22(*c*)

In this 'windows' approach (as I shall call it), one or more transparent, or translucent, or light-transmitting, droplets are located within a light-obscuring/blocking/reflective (or at least less, or differently, light-transmitting than the 1st droplet) 2nd measure of liquid. For the sake of example, the 1st (window) droplet might be a polar liquid, and the 2nd droplet might be a non-polar liquid.

The 'window' droplet is moved around on a hydrophobic surface to different locations, or is changed in its shape or size, by the employment of electrowetting effect, in any of the ways already discussed with respect to methods of moving or changing the shape of partially or entirely light-obstructing ('black droplets, in the above descriptions) or light filtering droplets in this document, or by any of the well-known methods of achieving this function by electrowetting effect, which are well-documented in my existing US patent on electrowetting displays, and in other prior art.

FIG. 22 (*a*): the circular items marked 1, 2 and 3 represent three different light-modulating, or light frequency converting (e.g., 'down converting') items or materials within a space distribution of such items or materials.

The circle marked 'droplet outline' represents the outer perimeter of the 'window droplet' which is being changed in its shape or location on a hydrophobic substrate, due to electrowetting effect.

The dotted oval shape represents a possible area of the second liquid, with which the 1st liquid is mutually immiscible. This might be a non-polar liquid such as oil, with the 1st liquid being a polar liquid, for example.

It will be understood that if for example the 2nd liquid were black, or light-reflecting, and if we imagine that the marked different light-modulating items 1, 2 and 3 were color light filters, for example, then in the state shown in (a), light would pass through the first, translucent/transparent droplet onto the colors 1, 2 and 3—but with most of the light passing onto/through the colors represented by 1 and 2.

I have inserted the letter A simply to indicate that this area might, for example, be simply a transparent area (in a light-transmitting version of the device)—or in a light-reflecting version, it might be reflective or simply white. Using time distribution techniques, it would in some configurations of this device be useful to modulate the proportion of time 'spent' on this area A, so as to modulate the brightness, or intensity, of the perceived color, for example, of the light which emerges from the system.

In 22 (*b*), we see that the droplet has been moved to a new location by electrowetting effect—thus changing (for example) the color balance of the light which emerges from the system, due to the fact that the light passing through the window droplet is now passing onto different items/colors within the space-distribution of different light-modulating items.

In 22 (*c*), we see that now the size of the droplet (i.e., its contact area with the hydrophobic surface upon which it is moving) has increased. This represents an addition tool in providing a wide range of light-modulating capabilities from this device.

In 22 (*d*), we see a cross-sectional view of the (e.g., polar) window droplet located 'within' the 2nd (e.g. non-polar) measure of liquid. The many possible arrangements of electrodes in this system are not shown, as they have been widely described in my existing US electrowetting patent, and in this document, and in other prior art. It will be appreciated from this drawing that if we wanted to cause the 'window' to stop operating, then it would be possible, with suitable droplet size and suitable distance between top and bottom enclosing surfaces, to achieve this by simply 'flattening' the window droplet sufficiently using established electrowetting means to achieve this with sufficient electrical potential causing the lower hydrophobic layer in contact with the droplet to become sufficiently hydrophilic.

In 22 (*e*), we see a plan (from above) view of the window droplet located together with the second liquid. 1 and 2 are provided simply to illustrate that the droplet may be changed in both location and shape, if desired.

It should be noted, incidentally, that of course there might be provided more than 2 types of liquid (in most cases, mutually-immiscible), and equally of course there might be more than one 'window' droplet within a system—thereby, for example, providing the means of simultaneously directing light to two or more different locations within said space distribution of different light-modulating or frequency-converting items, filters or materials.

It should also be noted that, if desired, electrode arrangements, and the electrical potential delivered to those electrodes, can be made so as to modulate the hydrophobic properties of both the upper and the lower inner surfaces in contact with the window droplet. For example, if both surfaces were very hydrophilic, the droplet could be caused to be very 'spread' on both top and bottom surfaces, and very narrow in the 'neck' between the top and bottom liquid-solid contact areas, in cross-sectional terms.

As has been pointed out many times in this article, the capabilities of this approach are extremely wide, as the particular items onto which we choose to selectively direct light is almost unlimited—they may be different colors, or different optical instruments, or other light-modulating surfaces or items, or they may be different frequency converting materials. Thus, if UV, or near-UV light were being emitted by one or more light sources incorporated within the device, then clearly we would be able to modulate the colors of light which emerged from the system by exciting different such materials to different extents at different times by allowing the UV light to pass onto them.

If these two liquids are located within two substrates or layers of material, and if (in most possible configurations) the window droplet extends from 'top' to 'bottom' of its volume from the inner surface of the top substrate to the inner surface of the lower substrate, then it will be appreciated that this droplet can act as a light path permitting light to pass through it.

In a light-transmitting version of this device (depending upon where the light source(s) were located), both top and bottom substrates enclosing the liquids on the upper and lower sides might be transparent, or at least translucent. Thus there might, for example, be a light source located below the device (in cross-sectional terms), so that the light is directed upwards, and passes through the 'window' droplet, and onto particular filters or other light-modulating or frequency-converting materials or items, depending upon the location or shape of the window droplet at any time.

Equally of course, the lower substrate might be light-reflecting—or there might be one or more light-reflecting items or surfaces located beneath (in cross-sectional terms) the lower substrate, if it was translucent. In this configuration, the space distribution of the items that light will reach through the window droplet may be located beneath the lower substrate. Thus, it will be appreciated that this device could be used, for example, as a light-reflecting display means using ambient light—or as a light-transmitting display means. Of course, its capabilities are not limited to display, and extend in scope to any application requiring dynamic light-modulating capabilities.

It will be understood that any light-filtering, or light-reflective surface(s) located 'below' the system (in light-reflecting mode, as described above) might comprise graphics, or lettering, in some arrangements or particular applications. Thus, if for example, the word 'Ricardo' was printed on a substrate beneath (in cross-sectional terms) the window device described, and if the window droplet were transparent, and the 2nd measure of liquid was dyed black, then as the droplet was moved over the area showing the word 'Ricardo', the observer would see that portion of that word which was revealed through the window droplet. Thus, this system represents a totally novel means of selectively displaying selected amounts of visual information or graphics or the like, and clearly has many applications in displays and signage.

Thus, in summary, this device is a 'moving hole' acting as a dynamic light path to allow light to pass onto selected locations of a space distribution of different light-modulating or light frequency-converting items—and then out towards the outside world, having been modulated as desired by the system.

The purpose of this approach is to allow light to pass through the 1st droplet or measure of liquid, but to control the amplitude, intensity or other properties of light which passes through the first liquid and then passes onto, for example, differently-colored light filters, or a space distribution of different light-modulating or light frequency-converting materials, so as to controllably change the color, amplitude, intensity, or other properties of light which emerges from this light-modulating system by means of employing electrowetting effect to change the liquid-solid contact area, or the droplet's shape (in plan, or cross-sectional terms), or to change it's location in respect of different locations or areas or items or elements within a space distribution of different light-modulating filters or items, or a space distribution of different light-frequency converting (e.g., 'down-converting') materials.

The purpose of these transparent droplets is to act as 'windows' within the (e.g., black-dyed) 2nd liquid. The transparent droplets (though they may not necessarily be transparent—but they must at least be translucent to some extent), thus, may not need to function as lenses, but may instead merely function as windows allowing light to flow through the 1st droplet, and to pass onto or through selected filters or light-modulating or frequency-converting elements, materials or items, for the purpose of providing an innovative light-modulating means—which could, for example, be used as a screen display or light projection system, or an optical signal switching/modulation system, or any of many other light modulating applications where dynamic modulation of properties of light are required.

Clearly, the controlled movement of such transparent 'windows' provides many different means of, for example, controlling the color of light emerging from the system. Such transparent droplets could, of course, alternatively have a 'flat top' (thus different from droplets functioning as a lens) or could alternatively function as a liquid lens. The droplet would be manipulated in shape or location on a hydrophobic surface by electrowetting means such as are described herein, in my existing US patent on electrowetting devices, or in other prior art on electrowetting devices.

Of course, many of the other droplet shape and size manipulations techniques discussed in this and the previous applications can also be applied to the above approach—.e.g., transparent 'window' droplets expanding/shrinking in total area above respective color filters or other light-modulating or frequency-converting filters, items or materials, and so on. Equally, solid optical elements within droplets—e.g., a light obstructing or light-reflecting particles, items or elements—could be manipulated or moved within a transparent or translucent droplet which is acting as a 'window' to permit the passage of light. And so on.

It should be appreciated that the above 'window' approach can also be used as a type of dynamically-controllable diaphragm (for example, for use in a camera to control the amount of light which is permitted to pass through the 1st droplet—e.g. by using electrowetting effect to increase or decrease the solid-liquid contact area), to control the amount of light permitted to pass through a light-transmitting/transparent or translucent or light-transmitting measure of liquid.

This could simply take the form of electrowetting effect being used to change the area of the droplet in contact with a hydrophobic surface—thereby increasing the size of the 'window'—or it could also take the form of the droplet acting as a window being caused by electrowetting effect to change location on a surface with respect to different areas or locations, or items or elements which have different light-modulating or light frequency-converting properties, so that the light passing through the droplet (which would be surrounded by a second liquid with relatively less, or zero, light-transmitting capabilities) passes onto or through filters or other light-modulating items which themselves serve to reduce the amplitude or intensity (or other light-modulating properties) of that light.

It should be understood that the only requirement here is that the light-transmitting properties of the first measure of liquid are higher than the second—or that the 1st liquid provides better optical properties (e.g., in terms of allowing more light to pass through it, or in terms of distorting images or the passage of light less than the 2nd liquid) than the 2nd measure of liquid.

An illustration of how wide the applications of this approach are may be provided with this example: the 1st liquid may be totally transparent, without any significant light or image-distorting properties; the 2nd liquid may also be translucent—but may have a somewhat 'misty' appearance to the human eye, rather like a bathroom window or a glass shower enclosure might have, for example. Such an approach could be used, for example, as an attractive and subtle dynamic visual display means—such as on the window of a restaurant, where the transparent 1st liquid droplets could display a graphic design (e.g., a bottle of wine) which would be transparent, allowing an observer to see through the wine bottle shape—but where the 2nd liquid would be sufficiently opaque to allow the observer to distinguish the wine bottle shape (or lettering, or whatever) when observing the restaurant window. Such a wine bottle shape might, for example, be made up of many different pixels or cells, each containing two liquids such as are described here.

Finally, it should be remembered that the window droplet may be of any color, or any light-modulating properties—i.e., not being limited to being transparent, and colorless—and this is also true of the 2nd liquid discussed.

A different angle on this general approach would be that a droplet caused by electrowetting effect to increase or reduce its contact area with a surface with which it is in contact, or to change its location on a hydrophobic surface, may be composed of, or may incorporate within its volume, one or more light frequency-converting materials. The change in the droplet's contact area with the substrate could then serve to increase or reduce the amplitude of light of particular colors emitted by such (e.g.) 'down-converting' materials when excited by, for example, ultra-violet or near-UV frequencies of light from an adjacent light source emitting those frequencies.

Use of Droplets to Change Internal or External Reflection

In my earlier patent application I pointed out that droplets moving on transparent surfaces can be used to change light paths by changing the internal (or external) reflection properties of the surface they are moving on, and to thereby cause light which would otherwise have been reflected off the other side of that substrate, or surface, from the side occupied by the droplet, to instead pass through it.

The sketch below serves to remind the reader of this technique, and to point out that many of my droplet systems, or derivates thereof, can be used in this way, or in combination with this approach, to provide a display or light projection means (as a simple example, the light path shown could be diverted through one or more color light filters). In certain cases, particularly where ambient or artificially-generated UV light is provided as a light source, such droplets may be dosed with a UV fluorescent dye. Alternatively, of course, such droplets may be dyed with one or more colors.

The Use of Droplets to Reflect/Deflect Light

While some of this document, and the patent applications by me which preceded it, have been concerned with the use of droplets to refract light. I have, however, often pointed out that reflecting, or deflecting light off the surfaces of droplets is equally feasible—and is included within my claims, and is applicable to any of the design approaches suggested here.

means of achieving this are almost innumerable—but they would largely rely upon manipulating the shape (profile) or position of a droplet so that the angle at which light arrives at the surface of a droplet can be varied so as to either reflect it, or not reflect it—or, of course, to modulate the angle of reflection from the droplet so that, for example, the light passes through different alternative color filters, or different points on a filter array, or other light-modulating or frequency-converting items.

The Use of Lasers with Droplets

Clearly, lasers, being merely a different form of light, can be used together with many of the droplet systems contained in this and my previous applications, and are thus contained within the claims for protection that I make. Clearly, many of the devices described herein would be suitable, for example, for optical signalling and communication means, as well as for modulating properties of the light from a laser being directed into systems described herein.

Systems Described Herein, and in My Previous Patent Applications, being Used as Optical Switches It will be readily appreciated that although I have mainly concerned myself with the use of my droplet manipulation and displacing techniques described in this and previous patent applications being used for display and dynamic light filter applications, they clearly can also be used for many applications—all of which I consider to fall within the scope of my patent applications. For example, they may be used as optical switches, since they potentially have the capability of providing an economic means of rapidly changing the quality, color or amplitude of light passing onto or through the droplets, or items contained on or in the droplets—thereby providing potential for being either an analog or digital switching means.

Systems Described Herein, and in My Previous Patent Applications, being Used as Dynamic Light Filters I have pointed out in my existing US electrowetting patent concerning droplet manipulation that the droplet systems described therein and herein can, in many cases, be applied to dynamically changing the color projected from a droplet-employing system—e.g., the color of light emitted by a lamp of suitable type and configuration, just as they may be used as a screen display means—but I would repeat that statement to apply to the systems described herein. Equally, many systems described herein could be used to modify other properties of light emitted from a lamp or similar device—for example, for changing the angle, or angle of distribution, of such light passing through the devices described herein.

Use of any Droplet Systems in Reflective, as Well as Transmissive, Mode

As I have mentioned in my existing US electrowetting patent, many of my proposed droplet systems—or other suchlike systems employing similar fundamental approaches—can be used either as reflective displays or as displays relying on a light-transmitting means associated with them—using backlighting, for example.

Multi-level Droplet Systems

I claim as my invention any practical combination of any droplet-using display or dynamic light-filtering device approaches described or implied herein, or in my previous applications relating to droplet-moving stems. Thus, for example, multi-level droplet systems would be included within the claims of this patent. (By 'multi-level', I mean droplet-using display or projection systems where more than one of my proposed approaches are used 'in parallel'—e.g., one above the other. Thus, if the system shown in FIG. 14 were duplicated underneath it, so that the droplets in each system moved independently or together, that would comprise one example of a 'multi-level system'.

Droplets Dyed with Multiple Colors

It should be noted, for the avoidance of doubt, that many of the droplet moving and/or distorting systems described in this and the previous applications can employ droplets which contain one or more colors—e.g., dyes. Thus, a single 'droplet' may in fact incorporate, for example, only one color, or many different colors across its volume or area, so that by exposing different colors to light paths by electrowetting means, different filtering effects take place.

The Term 'Liquid' in these Applications

The term 'liquid' in this and previous of my applications should be taken to include, as appropriate to each device and system, fluids including gases, air, gels, and the like. Thus, for example, droplets incorporating many colors within them may actually be closer to gels than to, say, glycol or water.

Color Combining 'Solid' Optical Instruments within, or on the Surface of, Droplets It is noteworthy that the term 'optical instruments' in the context of lenses, reflectors, prisms, etc. objects within or on droplets can include optical devices designed so that, rather than (for example) focussing light on a particular color within the visible spectrum as a standard lens does, an alternative manifestation of the same principles could simultaneously focus or direct light from the light source onto more than different point or area on a color filter array, and thereby 'combine' colors onto the display screen.

Addressing on 'Sets' of Electrodes to 'Pump' Droplets Across Surfaces

Already discussed are many different types of electrode arrangements. Although I have often used 'resistant electrode-type' arrangements, this is in no way to suggest that multiple different electrodes are unlikely to be used. Similarly, I have often simply only drawn one counter-electrode, or earth plane, on the other sides of illustrations. This does not mean that there would necessarily only be one counter-electrode opposite multiple electrodes on the other 'side' of the system—it is simply that this is not the focus of matters under discussion, as the principles behind, and the means of achieving, the displacement and/or distortion of droplets are well known to those skilled in the art, and constantly varying the number of electrodes here or there would simply be likely to distract the reader from the points at hand.

Both of these features have in fact quite a lot to do with speed of drawing, and with keeping the drawing simple so as to focus attention on particular points being currently discussed, than to suggest that one system is always preferable to another—or even that the particular arrangement of electrodes is even sensible or feasible in each case. Another reason for not spending much time or space in these documents on showing different possible electrode layouts is simply that such knowledge is widely known to those skilled in the art, and there is no point in repeating options that are obvious and well-known to those skilled in the art.

Notwithstanding the above, it is perhaps worth pointing out the following, for the avoidance of doubt. Just because a 'cell' in a display has many different electrodes, that does not mean, of course, that each electrode needs to be separately addressed. One of the reasons for the attractiveness in certain systems of using one or more resistant electrodes is to keep to a minimum the number of address lines leading to each cell, or pixel, or the display, whilst still retaining the ability to move or distort a droplet with a high degree of exactitude, rather than to be limited to a certain number of 'stop positions' along substrate, for example, which could be the case with a simple arrangement of a few electrodes underneath the (e.g.) hydrophobic polymer substrate.

In FIG. 24, the droplet is currently located roughly above and between a red and a yellow electrode lying beneath the hydrophobic surface of the lower substrate. The point here is that we can move the droplet to the right by applying appropriate electrical potential—as described already herein, and in earlier patent applications by me—to each of the colored sets—without needing to have a separate address line to each of the individual electrodes. Clearly, with reference to the above diagram, there could alternatively be a number of droplets located within the above shown array, instead of only one.

It should be remembered that, if necessary, suitable 'feedback' systems can be incorporated into the system to provide real-time monitoring of the location/posture of droplets, so as, for example, to 'pump' them along a surface such as that shown, containing many different electrodes which are nevertheless only addressed by a relatively small number of address lines.

Physical Indentations as Alternative 'Droplet Braking' Technique

Elsewhere herein I have discussed the use of patterns of hydrophobic/hydrophilic material to help retain droplets in the positions to which they have been moved by the electronic control system.

A simple alternative or complementary approach to this is the use of physical indentations, which may be arranged in patterns, to restrict the movement of droplets. Thus, instead of, or complementary with, an unwetted 'energy barrier' on one or more substrates with which the droplet may come into contact, an addition physical ridge may be used on one or more of said substrates to enhance the 'movement retarding' techniques available to retain droplets in desired positions. Advantageously, the position and shape characteristics of such 'ridges' would be designed so as to avoid disrupting any applicable light paths, etc.

An Alternative to the 'Resistant Electrode' Approach Already Discussed

A further tool in the armoury (so to speak) or controlling techniques applicable to droplet systems is that of an electrode which is so shaped that it is wider at one end, or at one or more points along its length, or across its surface, than it is in one or more other places, so that the electric field generated by said electrode (in combination with some counter-electrode) is greater where its surface area is wider than elsewhere.

A single address line, for example, may be attached to an electrode which (say) is long and narrow, but which becomes progressively wider at one end. This shape will, in the absence of other contradictory factors, cause a greater electric field to exist at the wider end than at the narrower end when the electrode is appropriately charged.

Clearly whilst it will not be possible (or at least, not sensible) to change the fixed shape of that electrode—and it thus does not have the dynamically-changeability of the 'resistant electrode approach'—the use of an electrode shaped as described above is nevertheless a useful tool, if combined with, for example, a similarly-shaped electrode which is reversed in position so that the second's wide end is opposite, and parallel to, the first's narrow end.

It will be appreciated that if the two electrodes are part of a droplet-controlling system such as those discussed herein, and are suitably positioned and configured to be able to influence the droplet's position, then by modulating the voltage applied to single address lines attached to each of the two electrodes (respectively), the droplet can be caused to controllably move back and forth as the position of the strongest electric field, and/or the strongest electrowetting influences, is controllably moved between the two electrodes.

'Tilting' or Rotating Solid Optical Instruments within or on Droplets by 'Tilting' the Electric Field It should be noted here that dipole techniques can be applied to tilt the angle (related to the top and bottom substrates, for example), or to cause the rotation, of a solid optical instrument which is located within, or on the surface of, a droplet.

FIG. 25 shows the fundamentals of a dipole-type electric-field controlled rotating or droplet system—which can be configured in so many different ways there is little point in specifying one or another approaches, as the principles of rotating or tilting a dipole item located within an electric field, and causing it to move in response to changes in that electric field, are so well known. However, in the context of the droplet-type systems that I have described, there are some new, and rather interesting, possibilities.

The optical item located in the droplet might have any feasible function—a lens, reflector, etc. It might bear different colors on different areas of its surface, and of course there are many possible locations for fixed position lenses which are not shown here to be located. I have also ignored many other questions, such as the fact that the droplet shown would be rather unlikely to keep its position in the centre of the droplet—and so on. These problems, and many possible solutions to them, are well-known to those skilled in the art and do not require rehearsing here.

There are some interesting ideas to be noted in connection with the above approach:

Firstly, that the droplet, and the optical item within it, can be so configured to be effectively separately-addressable. Thus, we can move the droplet in one direction or the other (this is not necessarily required in all possible approaches); and we can separately dictate the tilt, or rotational orientation, of the optical item within the droplet by applying different fields strengths, types, or field orientations by applying different voltages and polarities to the different electrodes.

The many different possible means of achieving the production of such fields are well-known, and the location and size of electrodes shown above should not be interpreted literally at all—they are merely there to shown that we have a number of separately-addressable electrodes above and below, and insulated from, the droplet and the item within it.

Since we clearly can separately control the droplet and the optical item within, various possibilities, however, arise:

The optical item could be a lens: light would pass onto and through it to one or more different colored filters, and then onward, for example, to the display screen. (Electrodes A and E, for example, could be charged with an appropriate to tilt the item as shown), though clearly it would seem advisable for the electrodes to be far closer together if that were the case, since moving the droplet itself might not be required The optical item could have differently-colored surfaces on the outside, and by rotating, tilting or twisting it, could display different colors or surfaces to the outside world on a screen.

The optical item could be a reflector, so that light passing onto it is controllably reflected onto differently-colored light filters—and then onwards to the screen display.

Permanent Magnets+Electro Hydrodynamic Droplet Displacement

If one or more permanent magnets were permanently positioned in appropriate locations vis-à-vis the optical item within/on a droplet, and if said optical item were subject to magnetic forces associated with said permanent magnets, or magnetised elements, then clearly the act of moving the droplet to the left or right could cause the optical item to tilt and/or rotate accordingly. (For example, if the spheres in the drawing above were magnetised, for example, with North and South poles replacing the '+' and '−' signs shown.

As an example: for the sake of simplicity, imagine that a magnet or magnetised material is located within or near the bottom substrate in the above drawing. If the magnet's North pole were facing upwards, and the optical item were currently located above and slightly to the left of that magnet's North pole, then as the droplet—and thus the optical item within—is drawn by electro hydrodynamic forces progressively to the right (say, by charging electrodes B and E) the magnetised optical item would then—assuming suitable design of the component parts of the system—be induced to progressively rotate so that its South pole constantly faced towards the magnet's North pole. Thus, in effect, a 'rolling' effect would be seen, with the optical item rotating clockwise until it moved out of the magnet's effective field.

Clearly, a potentially useful display system could be created using fundamentally this approach, whether the optical item were multi-colored on its outside, or was a lens as described above, or a reflector. It has to be said that the system would, in some applications of, or particular execution methods of this approach, have to incorporate suitable means of coping with the fact that the optical item was itself moving sideways. That wouldn't matter if the lens were simply a sphere that would operate similarly regardless of its orientation—thus directing light onto differently colored filters, for example—but it could in certain designs matter if our purpose was to rotate the magnetised sphere to expose different colors on its outside.

Clearly, however, the magnets and electrodes could be far closer together and smaller than the illustration above in order to minimise that sideways movement, and lens systems, minors and other devices—including even another droplet which 'followed' its movements on a separate substrate pair—could certainly be devised to cope with this movement of the optical item.

Figure 26:
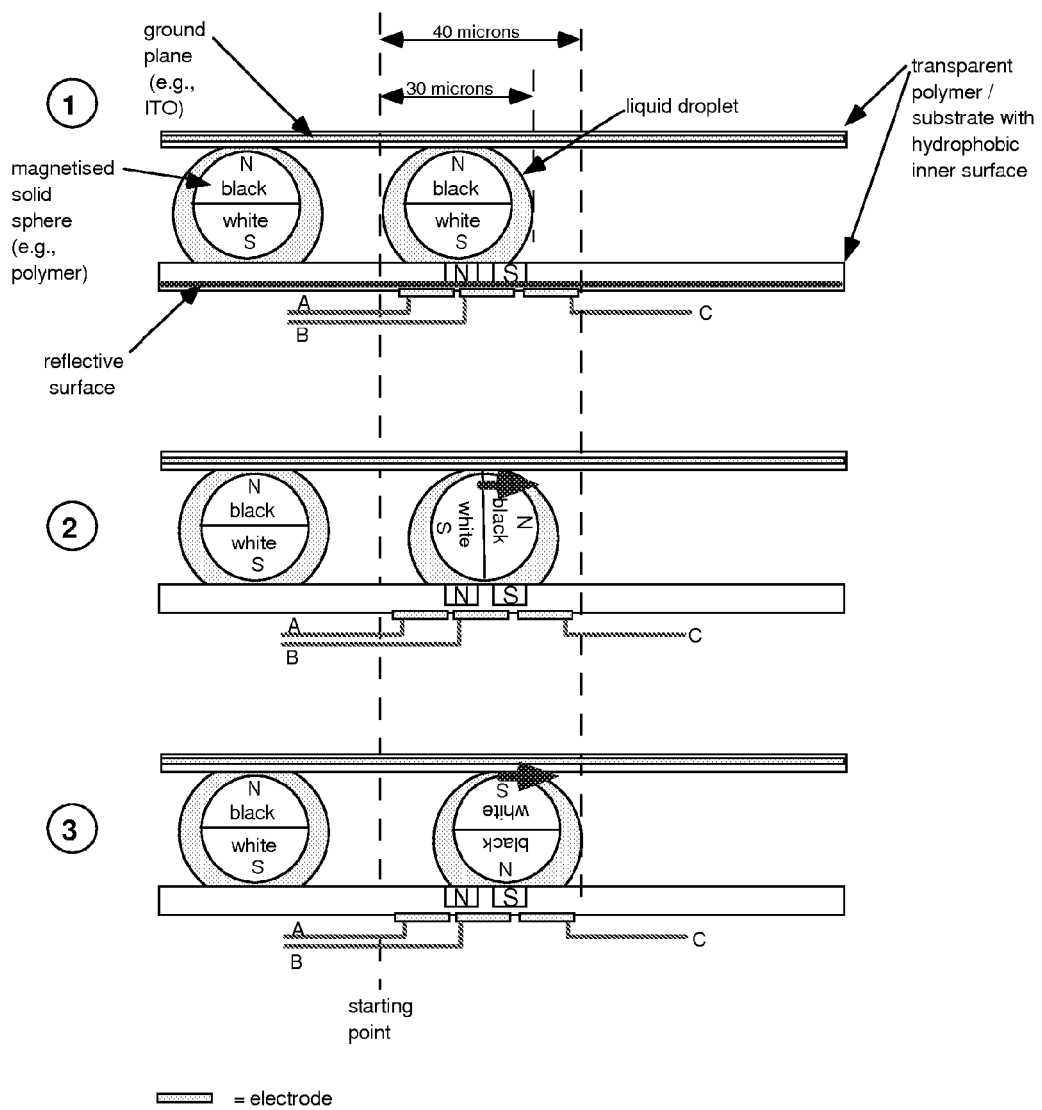
FIG. 26 shows an exemplary embodiment and three stages (from top to bottom) of the movement of the right-hand solid sphere, the surface of which is divided into two halves for color purposes (black and white). Electro hydrodynamic forces will be created by the appropriate charging of the electrodes rectangles, and these forces can, (as shown in the marked stage '2') induce the droplet, and the solid sphere within it, to move to the right.

Indeed, the system could if desired be modified to be either:
(a) more than one magnetised 'optical elements'—e.g., spheres—within each droplet, each bearing two or more colors or differently-reflective surfaces, so that by moving the droplet sideways, the (say) black or white-colored hemispheres of the spheres would be facing in the same orientation—say, upwards, towards the outside world—or
(b) a single sphere or other magnetised item, bearing at least two different colors on its surface, located within each single droplet (say, as part of a large number of such 'magnetised item within droplet'-configured droplets), each droplet being moved sideways by electro hydrodynamic or any other suitable droplet-moving system.
(b) first, it might look something like FIG. 26.

In this drawing, we see 3 stages (from top to bottom) of the movement of the right-hand solid sphere, the surface of which is divided into two halves for color purposes (black and white).

Clearly, electro hydrodynamic forces, acting in ways already discussed herein, will be created by the appropriate charging of the electrodes shown as yellow rectangles, and these forces can, (as shown in the marked stage '2') induce the droplet, and the solid sphere within it, to move to the right.

Located in or on the lower substrate in this example are shown the magnetic poles of one or more magnets, or magnetised elements (of course it might be one magnet, with respective poles shown).

The sphere is magnetised with a North and South Pole. Provided that the surface tensions of the droplet and the sphere are suitably configured, when the droplet is moved towards the right by electro hydrodynamic/electro wetting forces exerted by the electrodes, the sphere is forced to move with it. As it does so, it is forced to rotate to align its magnetic poles to conform to the magnetic fields generated by the two magnetic poles shown buried in the lower substrate.

As it rotates, the color perceived by an observer looking from above the system changes.

Thus, in stage '1' in the above drawing, the sphere's upper face is black. By the time it reaches its extreme right-hand position, it has rotated through 180 degrees, and its upper surface is now white.

Clearly, here we have the fundamentals of a rather interesting display system. As with most, if not all, of the drawings in this application, the particular arrangements of elements—electrodes, address lines, presence or absence of fixed-location lenses, etc., etc.—should not be taken as in any way prescriptive or limiting: on the contrary, this approach can be used in almost innumerable different configurations, both for black and white, and in color, etc., displays. It should also, incidentally, be remembered that this system could optionally be used, for example, in a 2-axis control system, instead of the one-axis approach shown above: this offers the potential for 'rolling' a ball covered with different colors in any direction, in order to expose the desired color to view. One or more permanently-located optical lenses may optionally be used to magnify the image of the portion of the outside surface of the sphere which it is desired should be displayed.

I claim as my invention any electronically-controlled droplet-moving display system which employs electro hydrodynamic forces to move droplets containing, or bearing, optical elements which are magnetised, where said movement of said droplet and the optical element(s) within causes said the optical elements to change their orientation and/or optical performance as a result of being exposed to changes in local magnetic fields generated by one or more permanent magnets appropriately located within the system.

Clearly, the optical elements could instead have been many other possible optical devices—including lenses or reflectors, for example, which are caused to tilt by the droplets containing them being moved sideways, and magnetic forces acting on them consequently changing, and tilting or rotating them; equally, instead of only black and white hemispheres, a multitude of different colors could be located on the outside surface of the spheres, with, optionally, fixed lenses located, for example, on the upper substrate so as to magnify the image of the upward-facing color on the spheres.

Whilst there are almost innumerable different ways of exploiting this combination of permanent magnetic fields and electro hydrodynamic displacement, or shape-distortion, of droplets, it is notable that potential 'technology mission' application areas for such display approaches are almost equally numerous: so-called 'electronic ink' would certainly appear to be one of them, bearing in mind the non-volatile potential for this system, and the potentially wide viewing angle that could be achieved with appropriate design approaches.

Figure 27:
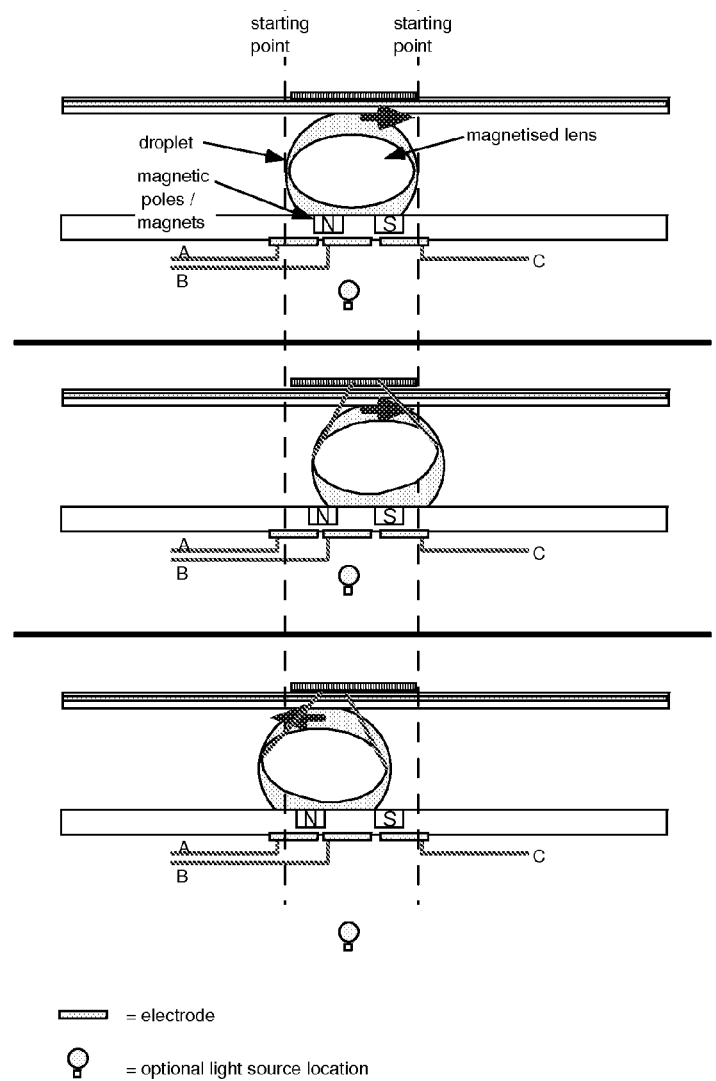
FIG. 27 shows an exemplary embodiment of an apparatus for adjusting the position and tilt of a lens in a droplet by exploiting a combination of permanent magnetic fields and electro hydrodynamic displacement or shape-distortion.

FIG. 27 illustrates how, as another possible use of this approach, a lens could be tilted obviously, the angles, electrode positions and size, etc. are not to be taken literally.

It is notable that the above system can be used in 2 axis rather than the one shown above so that, for example, a tiny sideways movement in one direction may cause the sphere to 'spin' in more than one axis, thereby displaying a different color to the outside world—whether directly, or through optical instruments such as reflectors, lenses, etc.

Equally, the lens shown above could instead have been a light-blocking element—so that it could be, for example, tilted to allow a smaller of greater amount of light (either in total, or in respect of particular light filters, and thus particular colors) to be allowed through the system.

It should also be observed that the permanent magnets shown could easily be replaced with, or complimented by, one or more electromagnet—and the droplet-moving system, could optionally similarly be eliminated if desired, since the electromagnet on its own could achieve the rotation of such a sphere.

Equally, the multiple black & white hemispheres shown—or suchlike spheres, etc., incorporating varied surface treatments—could be used in respect (each) of a number of different color filters—say, R, G B —to modulate the quantity of light of those different colors reaching a display screen, or the outside world. Equally, the liquid between the substrates could be an electrolyte, and the orientation of the sphere changed by applying different charges to said electrolyte.

As yet another example of the almost innumerable different applications of the above magnetic+droplet-moving technique, the magnetic item(s) shown in the lower substrate—or the substrate bearing them—could be moved sideways, thereby changing the magnetised sphere's orientation and displayed color or optical performance, with, optionally, the droplets being used, for example, to retain the spheres in their current location.

Whilst only one optical element—in the above two drawings, a sphere and lens, respectively—are shown within each droplet in the above diagram, the same principles can be used for multiple spheres or other optical instruments contained within each single droplet.

Equally, the magnetic elements shown in the lower substrate could be located at any suitable location in the cell, provided that the magnetised optical instrument may fall within the magnetic field of said elements at some point in its possible range of movement.

It should be noted that the droplet+sphere shown at the left does not change position or orientation in the above drawing: it is shown merely to illustrate that the above system could be used in a display array. Also, the physical size specifications shown in the drawing are purely to give a sense of one scale that this system might be operated on: it should not be taken as indicating any preferred scale or size for this approach.

Droplet Shape-Manipulation to Retain the Position or Orientation of Optical Instruments within the Droplet Also noteworthy is the fact that where droplets contain or incorporate on their surface solid optical elements which are caused to change their orientation, or position, as a result of any controllable forces exerted on them (e.g., magnetic or electric fields, or electro hydrodynamic forces), the shape or position of those droplets can be manipulated by electro hydrodynamic or other suitable forces or position so as to act to restrain said optical elements from movement where it is desired that they continue to perform their current optical or other function—i.e., that they do not change their current position or orientation.

As a simple example of this very useful technique, and referring to the drawing above, the electro hydrodynamic, electrostatic, or electrowetting forces acting on the droplet can be modulated to cause the droplet's shape to be compressed vertically—by, for example, making the surface beneath it to become more hydrophobic—thereby pressing the optical instrument within the droplet against the substrate beneath, and thereby exerting (e.g.) frictional forces on it to prevent to changing its location, or orientation.

Figure 28:
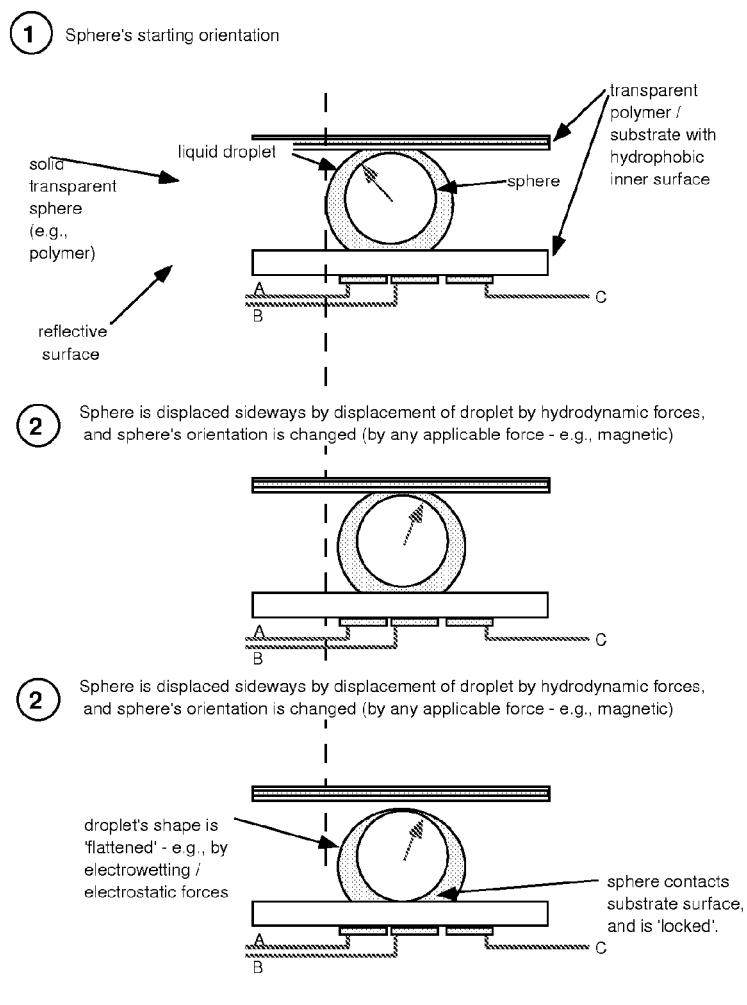
FIG. 28 shows an exemplary embodiment of an apparatus performing droplet shape-manipulation such as to retain the position or orientation of optical instruments within the droplet.

FIG. 28 illustrates this idea. No electrodes or other orientation/displacement instruments are shown in the drawing, as we are only concerned here with establishing a possible means of retaining the sphere's orientation once we have rotated it to the desired orientation—so the means of achieving the rotation is not important here.

It should be appreciated that this approach may be used for any systems described herein where an optical element is located within a droplet. The citing of the ability to exert frictional force on said element is merely an example of how this approach can be exploited: clearly, many other possible forces can be used to achieve the same end (i.e., of restraining the optical element's movement), where the droplet moves said optical element into a situation where its tendency to change its position or orientation is less as a result of said droplet movement, than it would have been without said droplet movement.

Physical contact between the optical element and another item is not necessarily required: the droplet may, for example, move said optical element into an energy field where the forces acting to retaining the element's current optical performance are stronger—e.g., it may be moved closer to one or more magnets. Equally, rather than moving the optical element into a location in order to achieve such a purpose, the droplet may 'drag' it away from the forces which caused the element to achieve a certain 'optical posture', so that said posture is retained (or indeed changed).

Clearly, where magnetised optical elements are employed, provisions must be made to ensure the physical distancing of one from another, lest they are sufficiently magnetically attracted to each other that they join together. This may be achieved by many possible alternative means, including physical separation of the different 'cells' of the system, or patterns of wettability to ensure no droplet, or optical item, is allowed to become unacceptably close to its neighbours (options, which, of course, always apply to any droplet system).

It should also be noted that where one liquid is located within an electrolyte liquid, or where the droplet is itself an electrolyte, if one or more electrodes are located in contact with either said electrolyte liquid, then a charge introduced to said electrolyte, combined with an appropriate, and oppositely-poled charge to one or more suitably-located electrodes proximate to the droplet, and insulated from it, this can provide another alternative means of changing the shape of the droplet.

Other Droplet/'Optical Instrument within Droplet' Locking' Systems

There are a great many different possible means of enhancing a droplet's mechanical 'resistance' to being displaced from a position, or a shape or profile, to which it has been moved by electrical means described herein. In addition, many of these approaches can also potentially be applied to increasing the forces retaining the orientation, and/or the position, of optical items contained within droplets.

Included within such approaches are the use of materials such as Bingham's plastic, visco-elastic materials, electro-rheological fluids and materials within the material from which droplets are composed, and/or within the material of which substrates within droplet-using display systems are composed, where, particularly, the droplet could come into direct contact with such substrates, or areas of such substrates composed of, or treated with, such materials.

Clearly, the primary application/purpose using any of these materials would be to be able to controllably (e.g., by the application of a suitable electric field, or electric charge, as applicable) affect the amount of force necessary to displace a droplet from a position to which it has been moved by the control electronics, and/or to retain the droplet's shape, and/or to inhibit movement of one or more optical elements within the droplet until such time as the electronic control system wished to change the applied electric field, or direct electrical charge applied to the material, so as to 'release' the droplet and/or optical instrument within it from that inhibiting influence—i.e., preparatory to changing its position or shape. Thus, for example, the shear properties, of the droplet's interface with a substrate with which it is in contact could be changed by the application of a suitable electric field, or electrical charge.

The Use of AC Voltages in Droplet-Using Display or Light Projection Systems

For the avoidance of doubt, some of the effects in this and my previous patent application documents that involve positioning of droplets (and indeed some other droplet-manipulating effects) using electrowetting effect are more controllable when AC voltages are applied.

The AC need not be sinusoidal—it can be square pulses, for example, which are easier to produce with digital electronics.

Thus, the use of AC, or alternatively DC, voltage for any appropriate types of my proposed droplet-moving or manipulating systems are included within the scope of this patent application.

Electro Hydrodynamic Rotation of a Sphere or Other Optical Instrument Bearing a Pattern of Differential Surface Tension An optical element such as a lens, reflector, prism, light-blocking element, etc. may be manufactured or treated so as to incorporate on its outer surface more than one zone of different surface tension. This approach may be used, in combination with the various electrical means of changing surface tension discussed herein, to manipulate the position, or orientation, of such any of the aforesaid optical elements, in accordance with the principles and approaches described herein.

Stylus-Employing Versions of any of the Display Systems Described Herein, or in My Previous Patent Applications In my U.S. Pat. No. 6,924,792, I gave an example of how a stylus connected to a droplet-based display system may be used. I should emphasise that my claims with regard to this, and my existing US electrowetting patent, also include any practical means of employing a stylus to work in combination with any of the droplet-based display systems discussed or implied herein. In many cases such combination will involve the use of the stylus tip to substitute for some other part of the system described herein—e.g., delivering an electrical charge to the stylus tip so that it can be one of the elements generating an electrical field affecting the droplets, or items within or associated with them.

Use of any Droplet System to Control the Brightness of Light

In this document, and in my preceding patent applications concerning droplet display and light projection systems, I have focussed most of my attention on means of controlling the color of light emerging from droplet-using systems.

It should be emphasised therefore, for the avoidance of doubt, that many of my proposed droplet-using display and/or projection systems may be used to control the brightness of light emerging from said systems—whether color-selectively, or simply the brightness of light irrespective of color.

The Use of Droplet Systems for Decorative Effects

There are many product missions where my proposed droplet-using display and light-projection systems may be used simply for decorative effect. As a simple example, the droplets may be used in such applications as sunglasses or glasses frames, where the purpose is merely to show a changing display of one or more different colors on the frames. This type of effect, which may optionally be constantly-changing, and may present a uniform color, or many different colors, across a surface to the view of the observer, can clearly be used in innumerable possible product applications. I claim all such applications as my invention.

Droplet Systems Used Simply to Redirect Light

It will be appreciated that whereas many of the droplet systems discussed by me have been used to change the color of light, any appropriate members of the systems proposed by me could be used to switch light reflection or transmission of and on, or to modulate the direction in which light emerges from said systems.

The said systems may simply be used to 'bend' light paths—for example, if an array of droplets—which may comprise multiple layers of droplet arrays—is used in front of a halogen light not to change its color, but to direct light which would otherwise have been emitted 'in front' of the lamp to be refracted so that the user of the system can redirect it to another angle—as an alternative to physically moving the lamp housing for example.

It should be noted that I also claim any means of achieving the same light-redirection function from a system of lenses in front of a lamp, where physical manipulation of the lenses, or lens arrays, allows the user to redirect the light from, say, shining onto the top of someone's head to shining on to a bowl of flowers a foot or so away from that person's head. This could, for example, be achieved by rotating a ring associated with the lens array(s) so that one or more lens array is moved to one side—thus 'bending' the light accordingly.

Notes

Use of more than 2 electrodes to position a droplet—i.e., by combining the forces of multiple electrodes on 'the same side' to distort, or spread, a droplet.

It should be emphasised that any systems, or approaches, involving the use of liquid droplets for display or light-filtering means described in this document, and in my previous applications, can be combined in any practical way whatsoever.

It should also be emphasized that the systems described only represent a small proportion of the many different ways that the principles involved can be applied. This, and my previous patent applications relating to droplets, should be seen in this context, and my claims are in no way limited to the actual systems described.

The invention claimed is:

1. A light-modulating device, comprising:
    a substrate;
    color filters provided on the substrate, the color filters having different colors from each other;
    a hydrophobic layer on the substrate;
    a droplet of a first fluid disposed on the hydrophobic layer, the first fluid having polarity or electric conductivity;
    a second fluid surrounding the droplet and being immiscible with the first fluid; and
    a first resistance electrode disposed under the droplet and configured to apply a first electric field to the droplet, the first electric field varying in intensity in a first direction; and
    a second resistance electrode disposed above the droplet, directly facing the first electrode, and configured to apply a second electric field to the droplet, the second electric field varying in intensity in a second direction different from the first direction,
    wherein the device is configured to modulate the shape or location of the droplet so as to selectively cover a corresponding one of the color filters.

2. The light-modulating device of claim 1, wherein the first direction is perpendicular to the second direction.

3. The light-modulating device of claim 1, further comprising a plurality of the first and second resistance electrodes that are each configured to apply an electric field that varies in intensity along the hydrophobic layer.

4. The light-modulating device of claim 1, wherein the first fluid is configured to block, obstruct, absorb or reflect light from passing onto or through the color filters.

5. The light-modulating device of claim 4, wherein the color filters comprise a red color filter, a green color filter, and a blue color filter.

6. The light-modulating device of claim 5, wherein pairs of the first and second resistance electrodes correspond to each of the color filters.

7. The light-modulating device of claim 1, wherein the second fluid is configured to block, obstruct absorb or reflect light from passing onto or through the color filters.

8. The light-modulating device of claim 7, wherein the color filters comprise a red color filter, a green color filter, and a blue color filter.

9. The light-modulating device of claim 8, wherein pairs of the first and second resistance electrodes correspond to each of the color filters.

10. The light-modulating device of claim 1, further comprising a light source providing a light to the color filters, wherein at least one of the color filters is a converter configured to change an amplitude or an intensity or a frequency of the light.

11. The light-modulating device of claim 10, wherein the converter converts ultra-violet rays or near UV rays into visible rays.

12. The light-modulating device of claim 1, wherein the hydrophobic layer has a gradient of progressively increasing hydrophobicity.

13. The light-modulating device of claim 1, further comprising a plurality of the droplets.

* * * * *